US012774786B2

(12) United States Patent
Pratt et al.

(10) Patent No.: US 12,774,786 B2
(45) Date of Patent: Oct. 27, 2026

(54) PORTABLE FUELING SYSTEM

(71) Applicant: Tactical Edge Systems, Inc., Billerica, MA (US)

(72) Inventors: Joseph Pratt, Fremont, CA (US); Adrian Narvaez, Denver, CO (US); Daniel Terlip, Wheat Ridge, CO (US)

(73) Assignee: Tactical Edge Systems, Inc., Billerica, MA (US)

( * ) Notice: Subject to any disclaimer, the term of this patent is extended or adjusted under 35 U.S.C. 154(b) by 0 days.

(21) Appl. No.: 18/797,173

(22) Filed: Aug. 7, 2024

(65) Prior Publication Data

US 2025/0180167 A1 Jun. 5, 2025

Related U.S. Application Data

(63) Continuation of application No. 18/166,441, filed on Feb. 8, 2023, now Pat. No. 12,092,268, which is a (Continued)

(51) Int. Cl.
*F17C 7/00* (2006.01)
*F17C 13/02* (2006.01)
*F17C 13/04* (2006.01)

(52) U.S. Cl.
CPC .............. *F17C 7/00* (2013.01); *F17C 13/025* (2013.01); *F17C 13/026* (2013.01); *F17C 13/04* (2013.01);
(Continued)

(58) Field of Classification Search
CPC ........ F17C 7/00; F17C 13/025; F17C 13/026; F17C 13/04; F17C 2205/0332;
(Continued)

(56) References Cited

U.S. PATENT DOCUMENTS 3,298,186 A 1/1967 Hendrix
5,590,538 A 1/1997 Hsu et al.
(Continued)

FOREIGN PATENT DOCUMENTS

EP 1093558 B1 4/2004
JP H07234030 A 9/1995
(Continued)

OTHER PUBLICATIONS

International Search Report and Written Opinion issued in International Patent Application No. PCT/US2021/041371 on Oct. 19, 2021 (6 pages).

(Continued)

*Primary Examiner* — Christopher M Afful
(74) *Attorney, Agent, or Firm* — Mintz, Levin, Cohn, Ferris, Glovsky and Popeo, P.C.

(57) ABSTRACT

A portable fuel gas system includes: a portable enclosure; a processor; a fuel gas supply manifold; a throttle in fluid communication with the fuel gas supply manifold. The fuel gas supply manifold includes a first pressure zone and a second pressure zone separated from one another by the throttle; a fuel gas shutoff valve in the first pressure zone, in electrical communication with the processor and operative to control a flow of a fuel gas in the fuel gas supply manifold; a vent valve in fluid communication with the fuel gas supply manifold and in electrical communication with the processor; and a pressure transmitter in fluid communication with the fuel gas supply manifold and in electrical communication with the processor.

17 Claims, 9 Drawing Sheets

Related U.S. Application Data continuation of application No. 17/373,892, filed on Jul. 13, 2021, now Pat. No. 11,603,965.

(60) Provisional application No. 63/163,215, filed on Mar. 19, 2021, provisional application No. 63/051,240, filed on Jul. 13, 2020.

(52) U.S. Cl.
CPC *F17C 2205/0332* (2013.01); *F17C 2221/012* (2013.01); *F17C 2227/044* (2013.01); *F17C 2250/032* (2013.01); *F17C 2250/043* (2013.01); *F17C 2250/0439* (2013.01); *F17C 2250/0626* (2013.01); *F17C 2265/063* (2013.01)

(58) Field of Classification Search
CPC .......... F17C 2221/012; F17C 2227/044; F17C 2250/032; F17C 2250/043; F17C 2250/0439; F17C 2250/0626; F17C 2265/063
USPC .............................................................. 141/4
See application file for complete search history.

(56) References Cited

U.S. PATENT DOCUMENTS

| | | | | |
|---|---|---|---|---|
| 6,435,224 | B2 | 8/2002 | Blatt et al. | |
| 6,786,245 | B1 * | 9/2004 | Eichelberger | F17C 5/06 141/2 |
| 7,128,103 | B2 | 10/2006 | Mitlitsky et al. | |
| 11,603,965 | B2 | 3/2023 | Pratt et al. | |
| 12,092,268 | B2 | 9/2024 | Pratt et al. | |
| 2003/0175564 | A1 | 9/2003 | Mitlitsky et al. | |
| 2006/0118175 | A1 | 6/2006 | Mathison et al. | |
| 2006/0180240 | A1 | 8/2006 | Niedzwiechi et al. | |
| 2006/0283237 | A1 | 12/2006 | Courrieu | |
| 2008/0185068 | A1 * | 8/2008 | Cohen | F17C 5/007 141/94 |
| 2011/0056570 | A1 * | 3/2011 | Bayliff | F17C 7/00 165/41 |
| 2013/0238226 | A1 | 9/2013 | Slaymaker et al. | |
| 2013/0240080 | A1 | 9/2013 | Fimian et al. | |
| 2014/0124071 | A1 * | 5/2014 | Esl | B60K 15/04 137/624.27 |
| 2016/0116364 | A1 * | 4/2016 | Vaccaro | G01M 3/229 73/40.7 |
| 2016/0201613 | A1 | 7/2016 | Ulrey et al. | |
| 2017/0051875 | A1 | 2/2017 | Nagura et al. | |
| 2017/0130901 | A1 | 5/2017 | Sloan et al. | |
| 2017/0146194 | A1 * | 5/2017 | Youlio | F17C 5/06 |
| 2021/0034872 | A1 * | 2/2021 | He | F17C 13/026 |
| 2022/0010931 | A1 | 1/2022 | Pratt et al. | |
| 2023/0235855 | A1 | 7/2023 | Pratt et al. | |
| 2025/0180167 | A1 | 6/2025 | Pratt et al. | |

FOREIGN PATENT DOCUMENTS

| | | | |
|---|---|---|---|
| JP | 2014092282 | A | 5/2014 |
| WO | 2018115456 | A1 | 6/2018 |
| WO | 2020057069 | A1 | 3/2020 |
| WO | 2022015691 | A1 | 1/2022 |

OTHER PUBLICATIONS

"Examination Report for AU Patent Appl. No. 2023202973, dated Jun. 5, 2024, all pages", Jun. 5, 2024.
"Examination Report for AU Patent Appl. No. 2023202973, dated Nov. 11, 2024, all pages".
"Examination Report for NZ Appl. No. 799845, mailed on Nov. 13, 2024 pgs all".
Extended European Search Report for EP 21843246.6, Nov. 27, 2023, 5 pages.
Wu, et al., "Thermodynamic study on throttling process of Joule-Thomson cooler to improve helium liquefaction performance between 2 K and 4 K", Energy 277, found online at https://www.sciencedirect.com/science/article/pii/S036054422301085X. (Year: 2023).
Klebanoff et al. (2012) "Final Report for the DOE Metal Hydride Center of Excellence", Sandia Report—SAND2012-0786, 163 pages.

* cited by examiner

PORTABLE FUELING SYSTEM

CROSS-REFERENCE TO RELATED APPLICATIONS

The present application is a continuation of U.S. patent application Ser. No. 18/166,441 filed Feb. 8, 2023, and entitled "Portable Fueling System," which is a continuation of U.S. patent application Ser. No. 17/373,892 filed Jul. 13, 2021, entitled "Gaseous Fueling System," now U.S. Pat. No. 11,603,965 issued 14 Mar. 2023, which claims the benefit of priority to U.S. Provisional Patent Application No. 63/163,215, filed 19 Mar. 2021, entitled "Gaseous Fueling System," and U.S. Provisional Patent Application No. 63/051,240, filed 13 Jul. 2020, entitled "Hydrogen Fuel Cell Boat," all of which are hereby incorporated by reference in their entireties.

BACKGROUND

Fuel cells can provide low or zero emission power for a variety of applications. Fuel cell systems may convert a gaseous fuel such as hydrogen, or hydrocarbons such as methane, propane, natural gas, or the like, into electrical power and exhaust products such as water vapor and, when using hydrocarbon fuels, carbon dioxide. However, because gaseous fuels are compressible and can escape into the atmosphere, transferring gaseous fuels such as from a filling station or delivery vehicle to a vehicle powered by a fuel cell is more complicated than delivering liquid fuels such as gasoline. Improved methods of transferring gaseous fuels into vehicles powered by such fuels are needed.

BRIEF SUMMARY

In one embodiment, a portable fuel gas system includes: a portable enclosure; a processor; a fuel gas supply manifold; a throttle in fluid communication with the fuel gas supply manifold, wherein the fuel gas supply manifold includes a first pressure zone and a second pressure zone separated from one another by the throttle; a fuel gas shutoff valve in the first pressure zone, in electrical communication with the processor and operative to control a flow of a fuel gas in the fuel gas supply manifold; a vent valve in fluid communication with the fuel gas supply manifold and in electrical communication with the processor; and a pressure transmitter in fluid communication with the fuel gas supply manifold and in electrical communication with the processor, wherein: the fuel gas supply manifold, the throttle, the vent valve, the pressure transmitter, and the fuel gas shutoff valve are disposed within the portable enclosure, the processor is configured to receive a user input and responsive to the user input, perform a purification sequence on the fuel gas supply manifold comprising: supplying a first quantity of the fuel gas to the fuel gas supply manifold by opening the fuel gas shutoff valve; monitoring at least one of a first elapsed time since the opening of the fuel gas shutoff valve or, via the pressure transmitter, a pressure in the fuel gas supply manifold; based on at least one of the first elapsed time or the pressure reaching a first threshold, closing the fuel gas shutoff valve; monitoring a second elapsed time since the closing of the fuel gas shutoff valve; based on the second elapsed time reaching a second threshold, venting at least a portion of the first quantity of the fuel gas by opening the vent valve; monitoring at least one of a third elapsed time since the opening of the vent valve or, via the pressure transmitter, the pressure in the fuel gas supply manifold; and based on at least one of the third elapsed time or the pressure reaching a third threshold, closing the vent valve.

In one embodiment, a portable fuel gas system includes: a portable enclosure; a processor; a fuel gas supply manifold; a throttle in fluid communication with the fuel gas supply manifold, wherein the fuel gas supply manifold includes a first pressure zone and a second pressure zone separated from one another by the throttle; a fuel gas shutoff valve in the first pressure zone, in electrical communication with the processor and operative to control a flow of a fuel gas in the fuel gas supply manifold; a vent valve in fluid communication with the fuel gas supply manifold and in electrical communication with the processor; and a pressure transmitter in fluid communication with the fuel gas supply manifold and in electrical communication with the processor, wherein: the fuel gas supply manifold, the throttle, the vent valve, the pressure transmitter, and the fuel gas shutoff valve are disposed within the portable enclosure, the processor is configured to receive a user input and responsive to the user input the processor is configured to perform a leak check sequence on the fuel gas supply manifold comprising: supplying a second quantity of the fuel gas to the fuel gas supply manifold by opening the fuel gas shutoff valve; monitoring at least one of a fourth elapsed time since the opening of the fuel gas shutoff valve or, via the pressure transmitter, the pressure in the fuel gas supply manifold; based on at least one of the fourth elapsed time or the pressure reaching a fourth threshold, closing the fuel gas shutoff valve; monitoring, via the pressure transmitter, a change in the pressure in the fuel gas supply manifold; based on the change in the pressure in the fuel gas supply manifold issuing an alarm, or supplying a third quantity of the fuel gas to a fuel gas storage vessel.

Optionally, in some embodiments, the fuel gas is hydrogen.

Optionally, in some embodiments, the vent valve comprises a first fuel gas vent valve in fluid communication with, and configured to selectively vent the fuel gas from, the first pressure zone.

Optionally, in some embodiments, the vent valve comprises a second fuel gas vent valve in fluid communication with, and configured to selectively vent the fuel gas from, the second pressure zone.

Optionally, in some embodiments, the throttle comprises an isenthalpic throttle.

Optionally, in some embodiments, the second pressure zone is in fluid communication with, and operative to supply, the third quantity of the fuel gas to the fuel gas storage vessel.

Optionally, in some embodiments, the second pressure zone is in fluid communication with, and operative to supply a portion of the third quantity of the fuel gas to, a pilot system.

In one embodiment, a computer-implemented method of supplying a fuel gas to a storage vessel with a portable fuel gas system, wherein the portable fuel gas system includes: a portable enclosure; a processor; a fuel gas supply manifold; a throttle in fluid communication with the fuel gas supply manifold, wherein the fuel gas supply manifold includes a first pressure zone and a second pressure zone separated from one another by the throttle; a fuel gas shutoff valve in the first pressure zone, in electrical communication with the processor and operative to control a flow of a fuel gas in the fuel gas supply manifold; a vent valve in fluid communication with the fuel gas supply manifold and in electrical communication with the processor; a pressure transmitter in fluid communication with the fuel gas supply manifold and in electrical communication with the processor, wherein the fuel gas supply manifold, the throttle, the vent valve, and the fuel gas shutoff valve are disposed within the portable enclosure; and a non-transitory computer-readable storage medium, the computer-readable storage medium including instructions that when executed by the processor, cause the processor to: perform a purification sequence on the fuel gas supply manifold including: supplying a first quantity of the fuel gas to the fuel gas supply manifold by opening the fuel gas shutoff valve; monitoring at least one of a first elapsed time since the opening of the fuel gas shutoff valve or, via the pressure transmitter, a pressure in the fuel gas supply manifold; based on at least one of the first elapsed time or the pressure reaching a first threshold, closing the fuel gas shutoff valve; monitoring a second elapsed time since the closing of the fuel gas shutoff valve; based on the second elapsed time reaching a second threshold, venting at least a portion of the first quantity of the fuel gas by opening the vent valve; monitoring at least one of a third elapsed time since the opening of the vent valve or, via the pressure transmitter, the pressure in the fuel gas supply manifold.

Optionally, in some embodiments, the vent valve comprises a first fuel gas vent valve in fluid communication with, and configured to selectively vent the fuel gas from, the first pressure zone.

Optionally, in some embodiments, the vent valve comprises a second fuel gas vent valve in fluid communication with, and configured to selectively vent the fuel gas from, the second pressure zone.

Optionally, in some embodiments, the throttle comprises an isenthalpic throttle.

Optionally, in some embodiments, the second pressure zone is in fluid communication with, and operative to supply, the third quantity of the fuel gas to the fuel gas storage vessel.

Optionally, in some embodiments, the second pressure zone is in fluid communication with, and operative to supply a portion of the third quantity of the fuel gas to, a pilot system.

Optionally, in some embodiments, a mobile user device in wireless communication with the processor, wherein the user input comprises a first user input received from the mobile user device via the wireless communication.

Optionally, in some embodiments, the system includes a vent mast in fluid communication with the vent valve.

Optionally, in some embodiments, the system includes a battery in electrical communication with the processor, the fuel gas shutoff valve, the vent valve, or the pressure transmitter.

Optionally, in some embodiments, the processor is configured to open the fuel gas shutoff valve to supply the fuel gas to a storage vessel, and the processor is further configured to close the fuel gas shutoff valve to stop the supply of the fuel gas to the storage vessel.

Optionally, in some embodiments, the processor is configured to stop the supply of the fuel gas based on a relation between an initial pressure in the vessel and an initial ambient temperature.

Optionally, in some embodiments, the relation includes: a first constant; plus a product of a second constant and the initial ambient temperature; plus a product of a third constant and the initial pressure in the vessel; plus a product of a fourth constant, the initial ambient temperature, and the initial pressure in the vessel.

DETAILED DESCRIPTION

Figure 1:
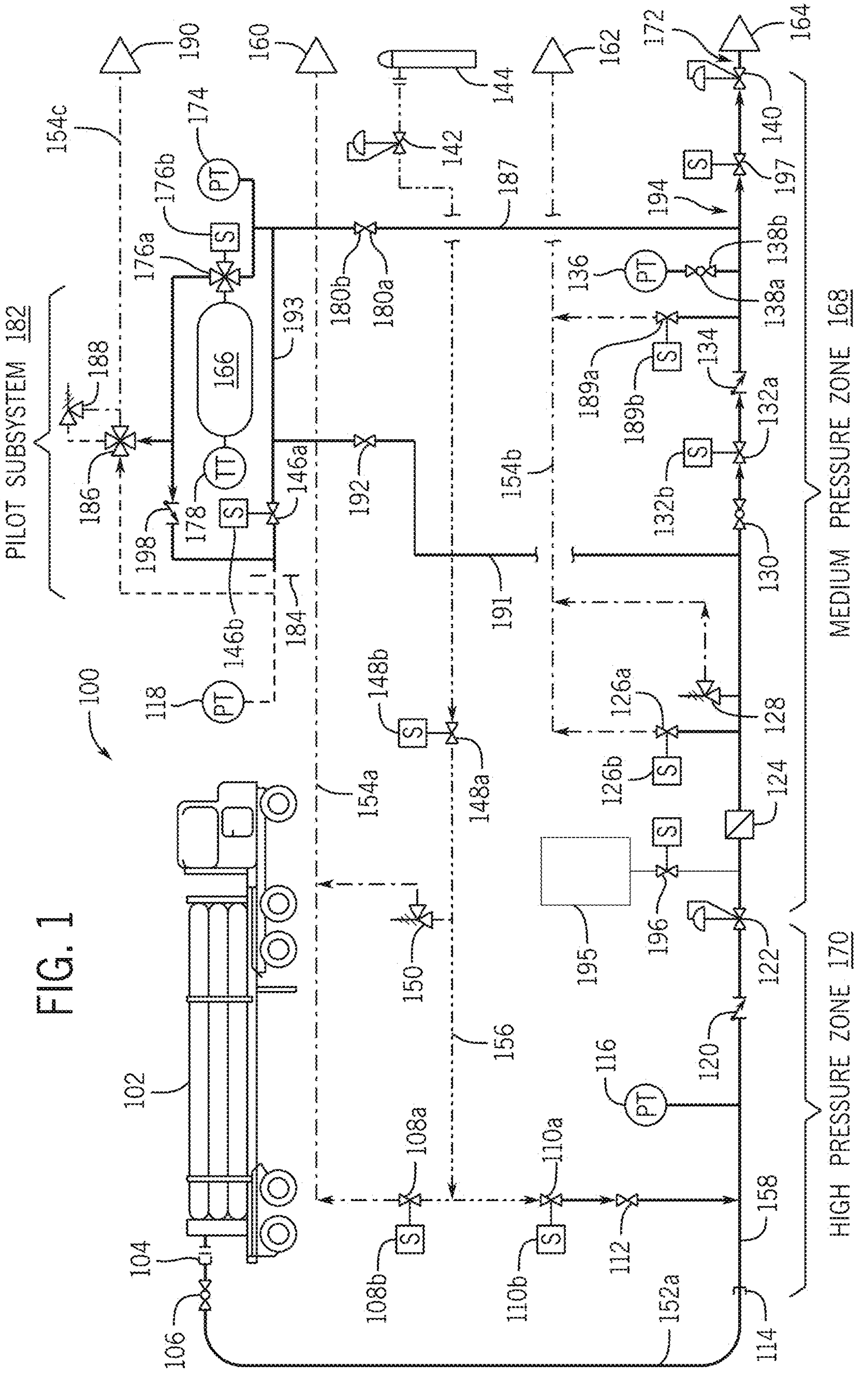
FIG. 1 illustrates one embodiment of a fueling system.

The present disclosure relates to methods of using a fueling system to transfer a fuel gas from a fuel supply to a vehicle powered by the fuel gas. In an example embodiment, methods disclosed herein may be used to transfer fuel from a fuel gas supply to an onboard fuel gas storage system in a boat. The methods disclosed herein may also be used with a variety of fuel gas supplies, including tube trailers, ground-based pressurized storage, and the like. The methods disclosed herein may be used to transfer fuel from a fuel gas supply to a fuel gas storage. In some implementations, the methods disclosed herein may be used to transfer fuel from a fuel gas supply (e.g., a pressurized vessel, a compressor, a gas generator such as an electrolyzer or reformer, or the like) to a vehicle. In some implementations, the methods disclosed herein may be used to transfer fuel from a vehicle to a fuel gas supply.

In many embodiments the fuel gas storage may be associated with or installed in a vehicle such as a boat, automobile, motorcycle, aircraft, or other vehicle. In other embodiments, the fuel gas storage may be a stationary storage facility such as associated with a fueling station for vehicles. In some embodiments, stationary power systems and/or gas appliances, may have on-site or integral fuel storage. In many embodiments a fueling system includes one or more conduits suitable to contain a fuel gas. In many embodiments, the fuel gas is pressurized above ambient pressure. The conduits may be arranged into one or more pressure zones, such as a high pressure zone, a medium pressure zone, and a low pressure zone in fluid communication with one another. The fueling system may include pressure reducing devices between the zones. For example, the fueling system may include a pressure reducing valve between the high pressure zone and the medium pressure zone to drop the pressure of the fuel gas as it flows from the high pressure zone to the medium pressure zone. Similarly, a pressure reducing valve may be disposed between the medium pressure zone and the low pressure zone to drop the pressure of the fuel gas as it flows from the medium pressure zone to the low pressure zone.

One or more of the pressure zones may be in fluid communication with one or more fuel gas storage vessels that receive fuel gas from the fuel gas supply via the fuel gas supply manifold. For example, a fuel gas storage vessel may receive fuel gas from the medium pressure zone. One or more of the pressure zones may be in fluid communication with a fuel gas end use device such as a fuel cell, motor, engine, reformer, burner, or the like. For example, the low pressure zone may be in fluid communication with a fuel gas end use device such that the low pressure zone supplies the end use device with the fuel gas at a suitable pressure and flow volume. In some implementations, a fuel cell system may convert the fuel gas in the fueling system into electrical energy that provides power to a propulsion system for a boat.

FIG. 1 illustrates one embodiment of a fueling system 100 for use with the methods disclosed herein. The fueling system 100 may be configured to releasably connect fluidically to a gas supply 102, such as one or more pressurized vessels. In the embodiment shown, the gas supply 102 is a tube trailer such as may be delivered to a site for fueling a vehicle via the fueling system 100. In some embodiments, the gas supply 102 may include fuel gas generator such as a reformer or an electrolyzer. In some embodiments, the gas supply may include a compressor. The fueling system 100 may include various process devices such as valves, sensors, filters, conduits, and the like, which are described in detail below.

Figure 2:
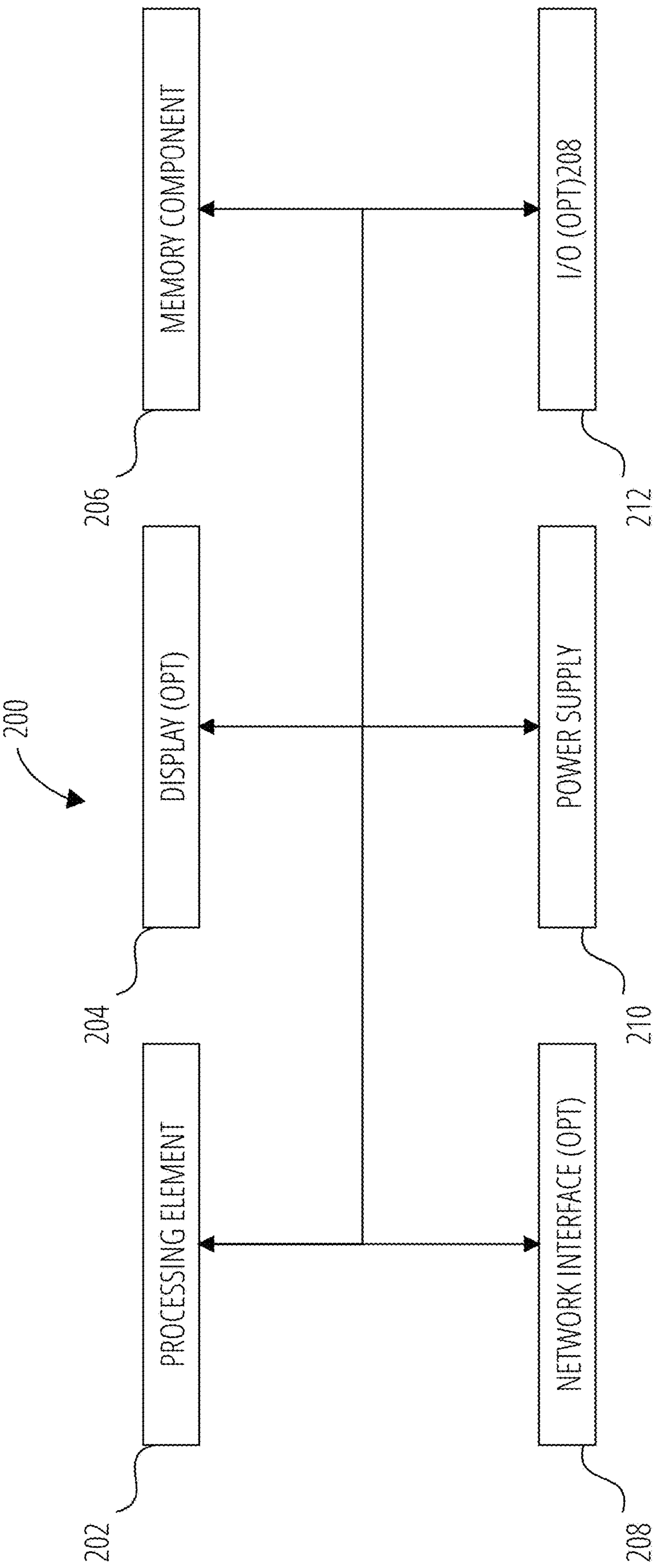
FIG. 2 illustrates an example of a controller suitable to control the system of FIG. 1.

As shown in FIG. 2, the fueling system 100 may be controlled by a processing element such as a controller 200, such as a programmable logic controller (PLC). FIG. 2 illustrates a simplified block diagram for the various devices of the controller 200. As shown, the controller 200 may include one or more processing elements 202, an optional display 204, one or more memory components 206, a network interface 208, a power supply 210, and an optional input/output I/O interface 212, where the various components may be in direct or indirect communication with one another, such as via one or more system buses, contract traces, wiring, or via wireless mechanisms.

The one or more processing elements 202 may be substantially any electronic device capable of processing, receiving, and/or transmitting instructions. For example, the processing elements 202 may be a microprocessor, microcomputer, graphics processing unit, or the like. It also should be noted that the processing elements 202 may include one or more processing elements or modules that may or may not be in communication with one another. For example, a first processing element may control a first set of components of the computing device and a second processing element may control a second set of components of the computing device where the first and second processing elements may or may not be in communication with each other. Relatedly, the processing elements may be configured to execute one or more instructions in parallel locally, and/or across the network, such as through cloud computing resources.

The display 204 is optional and provides an input/output mechanism for devices of the controller 200, such as to display visual information (e.g., images, graphical user interfaces, videos, notifications, and the like) to a user, and in certain instances may also act to receive user input (e.g., via a touch screen or the like). The display may be an LCD screen, plasma screen, LED screen, an organic LED screen, or the like. The type and number of displays may vary with the type of devices (e.g., smartphone versus a desktop computer, versus a PLC).

The memory components 206 store electronic data that may be utilized by the fueling system 100, such as audio files, video files, document files, programming instructions, and the like. The memory components 206 may be, for example, non-volatile storage, a magnetic storage medium, optical storage medium, magneto-optical storage medium, read only memory, random access memory, erasable programmable memory, flash memory, or a combination of one or more types of memory components. The memory components optionally linked via a cloud network or the like via the network interface 208.

The network interface 208 receives and transmits data to and from the network to the various devices of the fueling system 100. The network interface 208 may transmit and send data to the devices of the fueling system 100 directly or indirectly. For example, the networking/communication interface may transmit data to and from other computing devices through a network such as a RS-232, DH-485, CANBUS, MODBUS, Ethernet, Wi-Fi, Wi-Max, Bluetooth, ZigBee, or other suitable wired or wireless network. In some embodiments, the network interface may also include various modules, such as an application program interface (API) that interfaces and translates requests across the network.

The controller 200 may include a power supply 210. The power supply 210 provides power to various components of controller 200 and optionally to the components of the fueling system 100. The power supply 210 may include one or more rechargeable, disposable, or hardwire sources, e.g., batteries, power cord, AC/DC inverter, DC/DC converter, fuel cell, or the like. Additionally, the power supply 210 may include one or more types of connectors or components that provide different types of power to the various devices of the fueling system 100 or the controller 200. In some embodiments, the power supply 210 may include a connector (such as a universal serial bus) that provides power to the computer or batteries within the computer and also transmits data to and from the device to other devices.

The optional I/O interface 212 allows the controller 200 to receive input from a user and provide output to a user. For example, the I/O interface 212 may include a capacitive touch screen, keyboard, mouse, stylus, or the like. The type of devices that interact via the I/O interface 212 may be varied as desired.

Returning to FIG. 1, the fueling system 100 may include one or more breakaway couplings such as the breakaway coupling 104 and/or the breakaway coupling 114. The breakaway coupling 104 and/or breakaway coupling 114 may be suitable to stop the flow of gas through a conduit should the conduit rupture or otherwise accidentally disconnect when under pressure.

The fueling system 100 may include one or more check valves, such as the fuel gas check valve 120, the fuel gas check valve 134, the purge gas check valve 112, or the like. A check valve may be operative to allow the flow of a gas in one direction through the check valve but substantially prevent the flow of gas in an opposite direction through the check valve.

The fueling system 100 may include one or more on/off or shutoff valves. Shutoff valves may be operated manually or, in many embodiments, automatically via an actuator. Shutoff valves allow the flow of a gas therethrough when open and substantially prevent the flow of a gas therethrough when closed. The fueling system 100 may include one or more manually operated on/off shutoff valves such as fuel gas supply shutoff valve 106, a fuel gas shutoff valve 130, a block valve 138*a*, and a fuel gas storage isolation valve 180*a*. The fueling system 100 may include one or more automatically actuated shutoff valves such as a fuel gas shutoff valve 132*a*, a purge gas vent valve 108*a*, a purge gas supply valve 110*a*, a pilot subsystem shutoff valve 146*a*, a fuel storage vessel shutoff valve 176*a*, and a purge gas shutoff valve 148*a*.

The shutoff valves may be actuated by respective actuators such as a fuel gas shutoff valve actuator 132*b*, a purge gas vent valve actuator 108*b*, a purge gas supply valve actuator 110$b$, a pilot subsystem shutoff valve actuator 146$b$, a fuel storage vessel shutoff valve actuator 176$b$, a block valve actuator 138$b$, a fuel gas storage isolation valve actuator 180$b$, and/or a purge gas shutoff valve actuator 148$b$. In many embodiments, the actuators may be pneumatic devices (e.g., powered by a compressed gas such as air, nitrogen, or the like) that when operated open or close the respective valve to which they are coupled. In other embodiments, an actuator may be hydraulically driven, electrically driven, or the like. Any actuator may include, or be associated with, a position indicator that indicates the position of the valve actuated by the actuator. In some implementations, a position indicator may be a limit switch, proximity switch, or the like in electrical communication with a processing element of the controller 200 and operative to indicate the valve position to the processing element. In some implementations, a position indicator may indicate a valve position to a user of the fueling system 100, such as by use of a flag or other visual indicator of valve position. Any valve described herein may be an automated valve operated by an actuator controlled by a processing element. The position of any valve described herein may be indicated by a position indicator, which position indicator may be associated with an actuator, or may be a device separate from the actuator.

The fueling system 100 may include one or more pressure control valves. A pressure control valve may be configured to regulate the pressure of fuel gas upstream or downstream of the pressure control valve. For example, the fueling system 100 may include pressure control valves, also known as throttles, in the form of a purge gas forward pressure regulator 142, a fuel gas regulator (first stage) 122, and/or a fuel gas regulator (second stage) 140. These regulators, or throttles, may be forward pressure regulators that regulate a pressure of the fuel gas on the outlet, or downstream side of the pressure control valve. In some embodiments, the pressure control valve may be a backpressure regulator that regulates the pressure of the fuel gas upstream or on the inlet of the pressure control valve. Any pressure control valve described herein may be manually or automatically set. For example, a pressure control valve may be a current-to-pressure (I/P) controller, voltage-to-pressure controller (V/P), or like controller that accepts an electrical input from a processing element and controls a pressure upstream or downstream of the pressure control valve. In some implementations, pressure control valves may be manually set such as via bias spring or a pilot regulator. A pilot regulator may be automatically or manually controlled.

The fueling system 100 may include one or more fuel gas storage vessels 166. Each fuel gas storage vessel 166 may be any suitable container that can contain the fuel gas at a desired pressure. In some implementations, one or more of the fuel gas storage vessels 166 may be a metal (often steel or aluminum, but may be other metals and/or alloys) pressure vessel (commonly referred to as a Type I vessel). In some implementations, one or more of the fuel gas storage vessels 166 may be a metal pressure vessel (e.g., aluminum) with a fiber reinforced composite (e.g., glass, aramid, or carbon fibers held in a matrix) wrapped around the metal vessel (e.g., a Type II vessel). In some implementations, one or more of the fuel gas storage vessels 166 may have a metal liner (e.g., aluminum or steel) wrapped in a fiber reinforced composite (e.g., a Type III vessel). In some implementations, one or more of the fuel gas storage vessels 166 may have a polymer (e.g., thermoplastic) liner wrapped in a fiber reinforced composite (e.g., a Type IV vessel). In various embodiments, the fuel gas storage vessels 166 may be suitable to store a fuel gas at a pressure of 250-bar, 350-bar, 500-bar, or 700-bar nominal pressure. The fuel gas may be added to or retrieved from the fuel gas storage vessels 166 as needed. In some implementations, the fuel gas storage vessel 166 and pilot subsystem are optional. For example, the fueling system 100 may be used to supply the fuel gas from the fuel gas supply 102 to a fuel consumption device, without storage of the fuel gas.

In some examples, the fuel gas storage vessel 166 is suitable to contain a solid state storage medium such as a metal hydride. Solid state storage media may reversibly store fuel gases such as hydrogen in a non-flammable and low pressure state (e.g., about 70-100 bar) and may have certain advantages over traditional pressure vessels described above. For example, due to the generally lower pressures involved, the thickness of the wall of a vessel storing a solid state storage medium may be thinner and less costly than the wall of a traditional pressure vessel. Additionally, a vessel storing a solid state storage medium may be made in shapes that are more flexible or adaptable relative to traditional pressure vessels, which are usually cylindrical or spherical due to the stresses imposed on the walls by the pressurized gases contained therein. Some example solid state storage media that can store a fuel gas such as hydrogen include: destabilized hydrides (e.g., $LiBH_4/MgF_2$), anionic materials ($Mg(BH_4)_2$), amide/imide materials (e.g., $2LiNH_2+MgH_2$), and alane ($AlH_3$). Other solid state storage materials are described in L. Klebanoff & J. Keller, *Final Report for the DOE Metal Hydride Center of Excellence* (Sandia National Laboratories, SAND2012-0786 February 2012) which is incorporated herein by reference for all purposes.

The fueling system 100 may include one or more sensors that sense physical properties of the fuel gas, ambient conditions, and/or conditions of the components of the fueling system 100. Sensors may sense properties such as pressure or temperature. For example, the fueling system 100 may include one or more pressure transmitters such as a fuel gas supply pressure transmitter 116, a fuel gas first stage pressure transmitter 136, a fuel gas supply pressure transmitter 118, and/or a storage pressure transmitter 174. Likewise, the fueling system 100 may include one or more temperature transmitters such as a fuel gas storage temperature transmitter 178.

Sensors may convert a sensed physical property to an electrical signal suitable for receipt by the controller 200, or other suitable control system. For example, a sensor may convert a sensed physical property to an analog signal such as a current signal (e.g., a 4-20 mA signal, or the like) or a voltage signal (e.g., 0-5 V, 0-10 V, or the like). In some embodiments, a sensor may convert a sensed physical property to a digital signal such as a RS-232, DH-485, CANBUS, MODBUS, Ethernet, or other suitable form of digital signal. Either digital or analog signals may be transmitted by wires or wirelessly.

The fueling system 100 may include one or more filters such as a filter 124. A filter may be any device that allows a fuel gas to pass therethrough but blocks or traps particulate or liquid matter from passing. The fueling system 100 may include other filters as appropriate.

The fueling system 100 may include one or more pressure safety valves. A pressure safety valve is any device that relieves fuel gas from a conduit or vessel when the pressure of the fuel gas exceeds a set point pressure level. The relieved fuel gas may be vented to atmosphere. In some embodiments, a pressure safety valve may release the fuel gas when the pressure and temperature of the fuel gas exceed respective thresholds. For example, the fueling system 100 may include a purge gas pressure safety valve 150 and/or a fuel gas pressure safety valve 128.

The fueling system 100 may include one or more temperature pressure relief devices, such as the temperature pressure relief device 188. A temperature pressure relief device 188 may vent an unsafe buildup of pressure in a fuel gas storage vessel 166 when the temperature at the fuel gas storage vessel 166 also exceeds a threshold value. For example, a fuel gas storage vessel 166 may vent at a temperature of about 90° C., 100° C., 110° C., 120° C., or 130° C. In other examples, a fuel gas storage vessel 166 may vent at higher or lower temperatures. Such a situation may occur when the fuel gas storage vessel 166 is engulfed or otherwise exposed to fire, whereby the pressure of the fuel gas in the fuel gas storage vessel 166 may rise to an unsafe level.

The temperature pressure relief device 188 may be controlled by the devices of a pilot subsystem 182. In some embodiments, the pilot subsystem 182 is optional, such as when the system includes a temperature pressure relief device 188 that does not use a pilot subsystem 182. The pilot subsystem 182 may include devices to control the pressure in the fuel gas storage vessel 166 by opening the temperature pressure relief device 188 in the event of an unexpected rise in pressure of the fuel gas storage vessel 166. The pilot subsystem 182 may include a pilot subsystem shutoff valve **146*a* and a pilot subsystem shutoff valve actuator 146*b* that enable the pilot subsystem 182 to be charged with pressurized fuel gas. The flow of gas in to the pilot subsystem 182 may be restricted by an isenthalpic throttle, such as the pilot gas throttle 184, which may be an orifice. A conduit may fluidically connect the shuttle valve 186 to a location in the pilot subsystem 182 upstream of the pilot gas throttle 184, such as via a check valve 198. The check valve 198 may provide the advantage of reducing or preventing backflow through the pilot subsystem shutoff valve 146*a*, such as during an event when a fuel gas storage vessel 166 vents. The pilot subsystem 182 may include a shuttle valve 186. The shuttle valve 186 and/or the temperature pressure relief device 188 may vent gas to a pilot zone vent manifold 154*c*, which may vent gas to a vent mast, indicated by the arrow 190**.

The components of the fueling system 100 may be connected by one or more conduits suitable to contain the fuel gas and or a purge gas that may be used to clear fuel gas from the fueling system 100. In many embodiments, a conduit may be a hollow tube. The hollow tube may be rigid as with a pipe, or a hollow tube may be flexible such as a hose. A conduit may be made of any suitable material. In many implementations, conduits may be formed from 300 series stainless steel (e.g., AISI 316/316L steel). In many implementations the pressure of the fuel gas may have a nominal pressure of approximately 250-bar, 350-bar, 500-bar, 750-bar, 900-bar or higher. Fuel gas pressures may fluctuate about +/−25% from nominal values. Typically, conduits adapted to contain higher pressures may have thicker walls and/or smaller diameters than conduits adapted to contain lower pressures.

The fueling system 100 may be selectively fluidically couplable to the gas supply 102 by a fuel gas supply conduit **152*a*. In many implementations, the fuel gas supply conduit 152*a* may be a flexible hose. A flexible hose may have the advantage of allowing for fluctuations in the position of the gas supply 102 coupled to a vehicle (e.g., a tube trailer), or where the fueling system 100 is mounted to or associated with a movable vehicle itself (e.g., the fueling system 100** is on a boat that may bob in the water due to waves, or may float up or down relative to a dock based on the tide).

The fueling system 100 may include a fuel gas supply manifold 158 formed of one or more conduits. Likewise, the fueling system 100 may include a purge gas supply manifold 156 coupled to a purge gas supply 144 and to the fuel gas supply manifold 158. The purge gas supply 144 may be associated with the fuel gas supply 102 (e.g., may be included on a trailer with the fuel gas supply 102). In some implementations, the purge gas supply 144 may be associated with the fueling system 100. The fueling system 100 may include one or more vent manifolds, such as the purge gas vent manifold **154*a*, the fuel gas vent manifold 154*b*, and/or the pilot zone vent manifold 154*c*. The vent manifolds 154*a*, 154*b*, and 154*c* may be in fluid communication with respective vent masts, indicated by arrows 160, 162, and 190. In some implementations, the vent manifolds 154*a*, 154*b*, and 154*c*** may be in fluid communication with a common vent mast.

The fueling system 100 may include one or more pressure zones, such as a high pressure zone 170, a medium pressure zone 168, and/or a low pressure zone 172. In the implementation shown in FIG. 1, the high pressure zone 170 includes the breakaway coupling 104, the fuel gas supply shutoff valve 106, the fuel gas supply conduit **152*a*, the breakaway coupling 114, the purge gas check valve 112, the fuel gas supply pressure transmitter 116, the fuel gas check valve 120, and the fuel gas regulator (first stage) 122. The high pressure zone 170 may include a filter like the filter 124. In some implementations, the fuel gas may flow from the gas supply 102, through the breakaway coupling 104 to the fuel gas supply shutoff valve 106. The fuel gas flow may be controlled by the fuel gas supply shutoff valve 106. The fuel gas supply shutoff valve 106 may be manually or automatically actuated. Providing the high pressure zone 170 (e.g., at the pressure of the fuel gas supply 102) and the medium pressure zone 168 (e.g., via the fuel gas regulator (first stage) 122**) may have certain advantages. It may be more efficient to transport a fuel gas at a high pressure than at a low pressure. For example, when a fuel gas is supplied via a tube trailer, the higher the pressure in the tubes, the more fuel can be included in a given shipment for a very small incremental cost in fuel (e.g., diesel for the tractor pulling the trailer). However, higher transport pressures may not be compatible with a fuel gas storage system (i.e., may be higher than a pressure vessel or conduit pressure rating). Vessels with lower pressure ratings are generally less expensive than those with higher pressure ratings and may be used in fuel gas storage systems where size or weight is less of an important consideration (e.g., stationary fuel gas storage). Thus, dropping the pressure of the fuel gas between the high pressure zone and the medium pressure zone may enable the use of efficient high pressure delivery with lower cost, lower pressure storage systems.

When the gas supply 102 is connected to the breakaway coupling 104, and the fuel gas supply shutoff valve 106 is open, fuel gas may flow from the gas supply 102 to the fueling system 100 via the fuel gas supply conduit **152*a*. The fuel gas supply conduit 152*a* may couple to the fueling system 100 via the breakaway coupling 114. The fuel gas may flow through the fuel gas check valve 120 toward the fuel gas regulator (first stage) 122. An advantage of placing the fuel gas check valve 120 upstream of the fuel gas regulator (first stage) 122 may be seen in the case of the sudden or unintentional loss or disconnection of the fuel gas supply conduit 152*a*, wherein the fuel gas will be prevented from flowing backward out of the fueling system 100 into the atmosphere. Generally, it is preferable to contain fuel gases in appropriate systems, because when fuel gases escape, they can ignite or explode. The fuel gas supply pressure transmitter 116 may be placed in any suitable location in the fuel gas supply manifold 158 such that it can sense the pressure of the high pressure zone 170. The fuel gas supply manifold 158 may include a conduit that fluidically couples the high pressure zone 170 to the purge gas supply manifold 156, such that a purge gas may be used according to methods of the present disclosure to purge fuel gas from the fuel gas supply manifold 158**.

The high pressure zone 170 may couple to the medium pressure zone 168 at the fuel gas regulator (first stage) 122. The fuel gas regulator (first stage) 122 may drop the pressure of the fuel gas between the high pressure zone 170 and the medium pressure zone 168. For example, the gas supply 102 may supply the fuel gas at a pressure such as 500-bar. The fuel gas regulator (first stage) 122 may drop the pressure of the fuel gas as supplied by the gas supply 102 from 500-bar to a lower pressure such as 100-bar, 200-bar, 250-bar, 350-bar, 400-bar or the like. In some examples, the fuel gas regulator (first stage) 122 may drop the fuel pressure to a pressure compatible with a solid state storage system like a metal hydride. For example, the fuel gas regulator (first stage) 122 may drop the pressure of about 10-40 bar.

Fuel gas may flow from the fuel gas regulator (first stage) 122 into the medium pressure zone 168. The fuel gas may flow from the fuel gas regulator (first stage) 122 to a filter 124 to trap or remove particulate matter or liquids from the fuel gas. The fuel gas may flow from the filter 124 to the fuel gas shutoff valve 130 and then to the fuel gas shutoff valve 132*a*. The fuel gas shutoff valve 130 may be used to manually shut off the fuel flow. In some implementations, either of the valves 130 or 132 may be optional. For example, a system may include a manual shutoff valve 130 and not an actuated valve 132*a*, or vice versa. The fuel gas shutoff valve 132*a* may be opened or closed by the fuel gas shutoff valve actuator 132*b* to respectively allow or stop the flow of the fuel gas in the fuel gas supply manifold 158. The fuel gas first stage pressure transmitter 136 may be placed in any suitable location in the fuel gas supply manifold 158 such that it can sense the pressure of the medium pressure zone 168. The block valve 138*a* may be supplied to isolate the fuel gas first stage pressure transmitter 136 from the medium pressure zone 168 such as for maintenance purposes. The fuel gas may flow from the fuel gas shutoff valve 132*a* to the fuel gas check valve 134. The fuel gas check valve 134 may prevent backflow of the fuel gas to portions of the medium pressure zone 168 upstream thereof. The medium pressure zone 168 may include a branch in selective fluid communication with the vent manifold 154*b*, such as via a valve 189*a*. The branch may be disposed downstream of the check valve 134 or other suitable locations in the fuel gas manifold 158. The valve 189*a* may be selectively operable (e.g., openable or closable) by an actuator 189*b*. Such a branch may be used to vent and/or inert the fuel gas storage vessel 166 and/or other parts of the fueling system 100.

The fuel gas supply manifold 158 may include or connect to a branch or tee 194 in the medium pressure zone 168. The tee 194 may be integrally formed with the fuel gas supply manifold 158. In some examples, the tee 194 may be in fluid communication with the fuel gas supply manifold 158 by connection with a flexible hose. One leg of the branch may flow to the low pressure zone 172 via the fuel gas regulator (second stage) 140. A shutoff valve 197 may be supplied upstream of the regulator 140. The shutoff valve 197 may provide the advantage of providing a positive shutoff of the fuel gas to the regulator 140. The low pressure zone 172 may be in fluid communication with, and flow fuel to, one or more fuel consumption devices such as one or more fuel cells, engines, or the like, as indicated by the arrow 164. As with the fuel gas regulator (first stage) 122, the fuel gas regulator (second stage) 140 may be a forward pressure regulator that drops the pressure from the medium pressure zone 168 to a lower pressure for use in the low pressure zone 172. For example, the fuel gas regulator (second stage) 140 may drop the pressure of the fuel gas from 350-bar to a pressure suitable for an end use device like a fuel cell. For example, the fuel gas regulator second stage 140 may drop the pressure of the fuel gas to 10-bar. In some examples, the fuel gas regulator (second stage) 140 may drop the pressure of the fuel gas from pressure in the fuel gas storage vessel 166 such as about 900-bar to a pressure suitable for fueling a vehicle such as about 500-bar, 625-bar, 700-bar, and/or 875-bar. The other branch may be a storage vessel supply branch 187 that supplies the fuel gas to the pilot subsystem 182 and/or to one or more fuel gas storage vessels 166, such as through the fuel gas storage isolation valve 180*a*. The fuel gas may be supplied from the storage vessel supply branch 187 to the pilot subsystem by a branch 193 in fluid communication with the branch 187 and the pilot subsystem 182. In some embodiments, the fueling system 100 may optionally include a pilot supply branch 191 to supply the fuel gas to the pilot subsystem 182 that is separate from the storage vessel supply branch 187. The pilot supply branch 191 may be selectively closable by a shutoff valve 192. In the example shown in FIG. 1, the pilot supply branch 191 extend from the fuel gas supply manifold 158 between the fuel gas pressure safety valve 128 and the shutoff valve 130. In other embodiments, the pilot supply branch may branch from any suitable location in the fuel gas supply manifold 158. Providing a separate pilot supply branch 191 may have the advantage of enabling the filling of pilot subsystem 182 without using the storage vessel supply branch 187, such as to fill the pilot subsystem 182 to a higher pressure than the fuel gas storage vessels 166. In some examples, a fuel gas storage vessel 166 may include a check valve that would let fuel gas to flow into the vessel when the manifold pressure is greater than tank pressure.

Fuel gas may flow through the pilot subsystem shutoff valve 146*a* when opened, such as by the pilot subsystem shutoff valve actuator 146*b*, and through the pilot gas throttle 184 to charge the pilot zone. The pilot subsystem 182 may hold the fuel gas pressure and cause the shuttle valve 186 to remain closed. In the event an excess temperature is detected by the temperature pressure relief device 188 (e.g., a fire is detected), the temperature pressure relief device 188 may vent the fuel gas in the pilot subsystem 182 and drop the pressure, such as via the pilot zone vent manifold 154*c*. When the pressure in the pilot subsystem 182 drops, the shuttle valve 186 may open and vent the fuel gas from the fuel gas storage vessel 166. The flow rate of fuel gas through the shuttle valve 186 and/or the temperature pressure relief device 188 may be higher than the flow through the pilot gas throttle 184 such that pressure in the pilot zone may not be maintained and the fuel gas storage vessel 166 may vent during a fire.

The fueling system 100 may include an additive supply vessel 195. The additive may be a solid, liquid, or gas that can be added to the fuel gas or the purge gas to imbue the respective gas stream with new or improved properties. In one example, the additive may be ab odorant and the additive supply vessel is used as an odorant supply vessel 195. The odorant supply vessel 195 may be in selective fluid communication with the fuel gas manifold 158, such as via a control valve 196. Many fuel gases are doped with an odorant (e.g., methyl mercaptan) that has a characteristic rotten egg smell. Such dopants may alert nearby users to a leak of the fuel gas. Some fuel gases, such as hydrogen, may be delivered without such odorants. For example, fuel cell systems that convert hydrogen to electricity may be damaged by even low concentrations of elements like sulfur present in methyl mercaptan. It may be advantageous to add a non-damaging odorant to the fuel gas. Some examples of odorants that are suitable for use with a fuel cell system include ethyl acrylate, methyl acrylate, 2-ethyl-3methylpyrazine, 5-ethylidene-2-norbornene, acrylic acid esters, acetophenone, propionaldehyde, n-butyraldehyde or mixtures thereof.

The odorant supply vessel 195 may supply an odorant to the fuel gas via a wick from which the odorant evaporates into the fuel gas. The odorant supply vessel 195 may supply an odorant to the fuel gas via a drip-style system where the odorant is fed into the fuel gas at a controlled rate of drops of a liquid. The odorant supply vessel 195 may supply the odorant to the fuel gas via an injection type system where the odorant is compressed and released through a valve (e.g., via the control valve 196).

Figure 9:
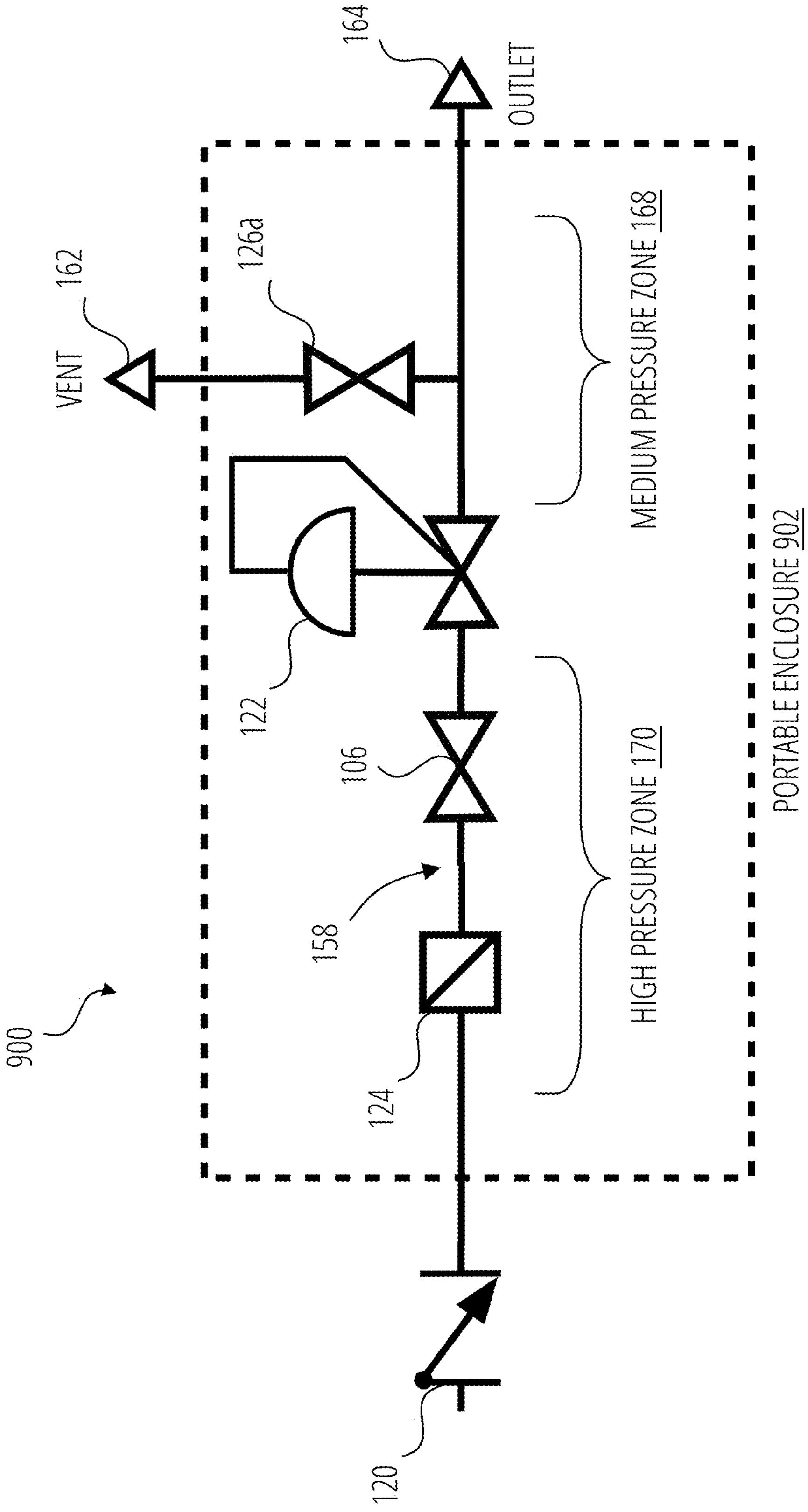
FIG. 9 illustrates a portable embodiment of a fueling system.

With reference to FIG. 9, in some embodiments, the fuel system 100 may be portable, such as by packaging components of the system in an enclosure 902. In a portable embodiment of the system 900, the system may include the fuel gas supply shutoff valve 106, fuel gas supply conduit **152*a*, the breakaway coupling 114, fuel gas supply manifold 158, the fuel gas check valve 120, the fuel gas regulator (first stage) 122, the filter 124, fuel gas pressure safety valve 128, the shutoff valve 130, the fuel gas shutoff valve 132*a*, fuel gas check valve 134, the block valve 138*a*, the block valve actuator 138*b*, the purge gas forward pressure regulator 142, the purge gas shutoff valve 148*a*, the actuator 148*b*, the purge gas pressure safety valve 150, the purge gas vent valve 108*a*, the purge gas supply valve 110*a*, the pressure transmitter 118, the fuel gas vent valve 126*a*, the shutoff valve 197, the tee 194, and optionally the fuel gas to the regulator 140 and/or fuel gas storage isolation valve 180*a* and actuator 180*b***.

Figure 3:
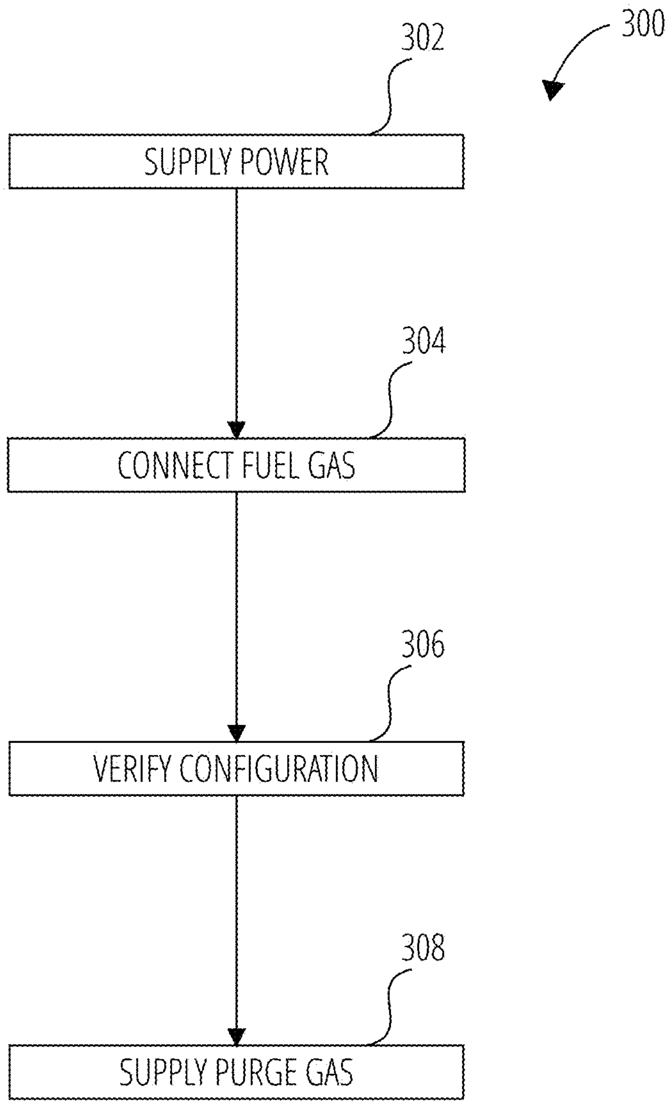
FIG. 3 illustrates an example of a method suitable for preparing the system of FIG. 1 to receive a fuel gas.
Figure 4:
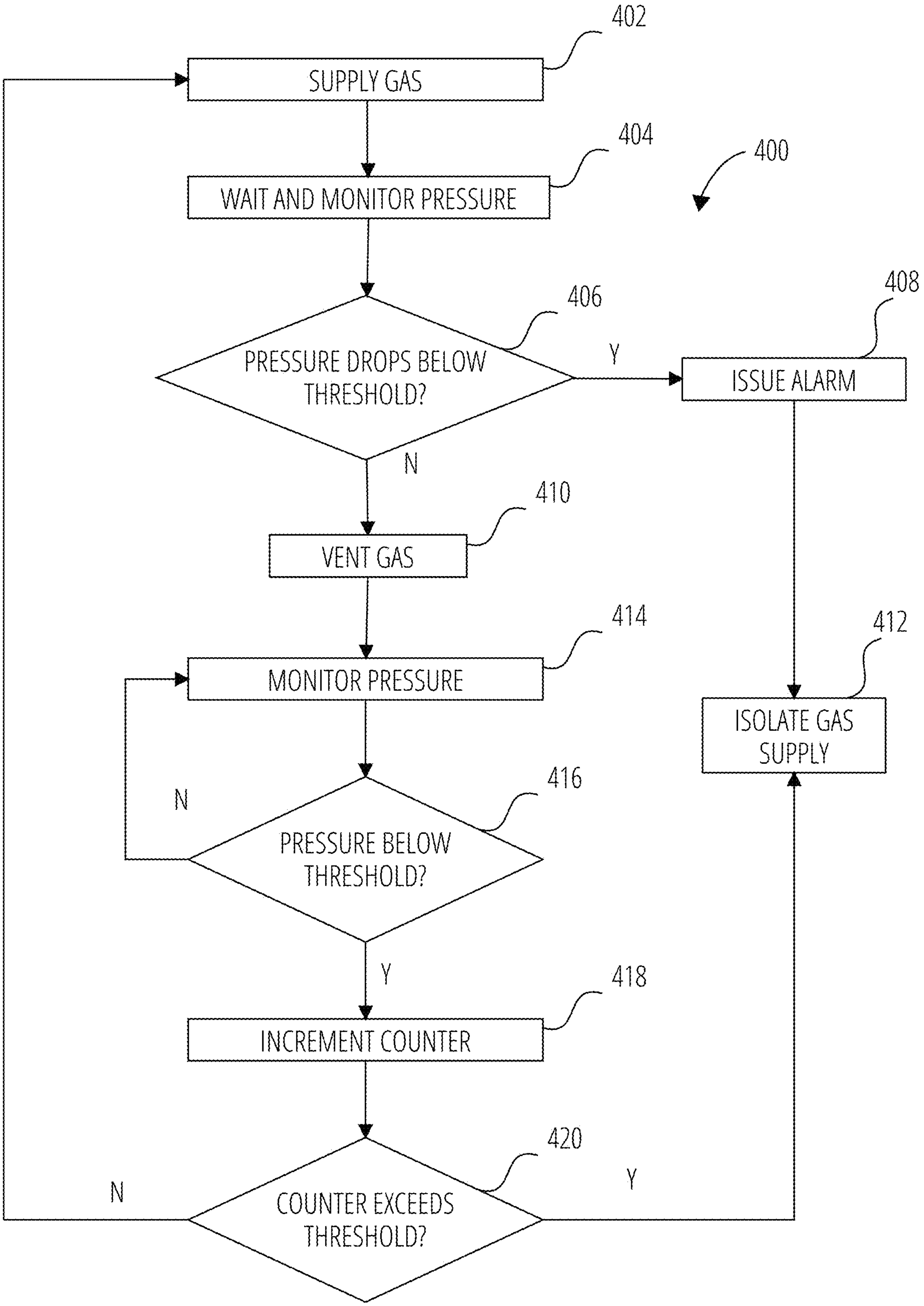
FIG. 4 illustrates a method suitable for removing air and/or fuel gas from the system of FIG. 1.
Figure 5:
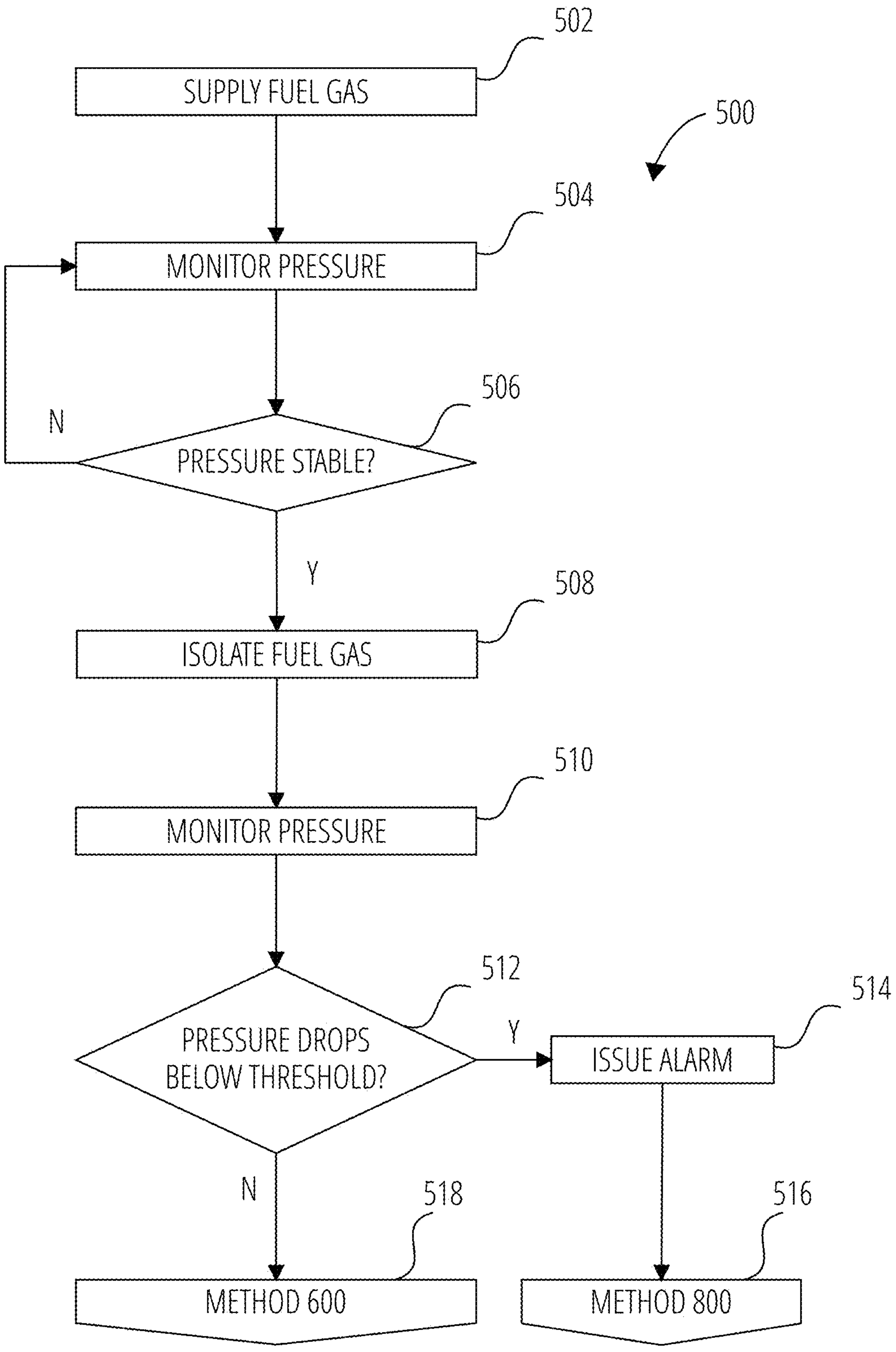
FIG. 5 illustrates an example of a method suitable for checking the system of FIG. 1 for a fuel gas leak.
Figure 6:
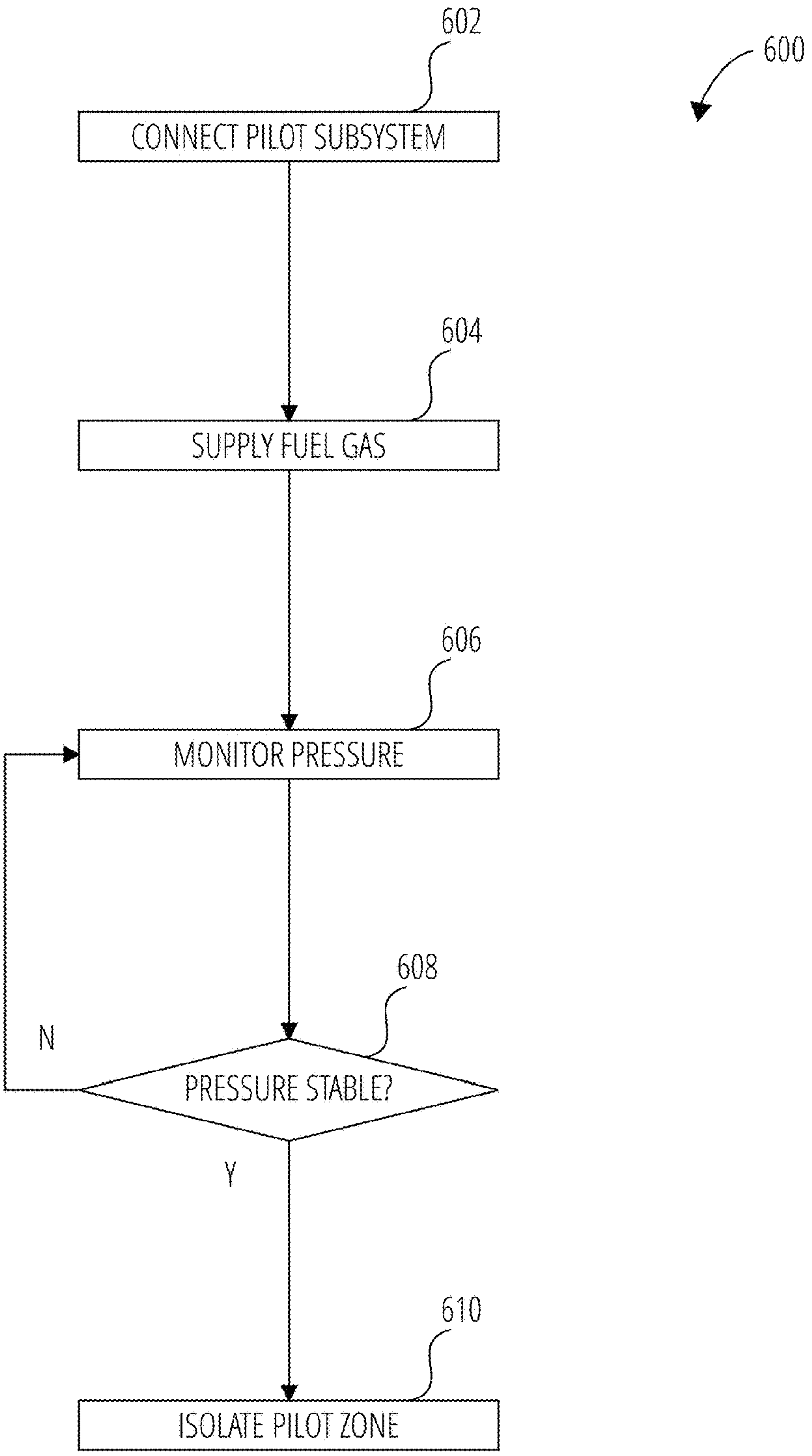
FIG. 6 illustrates an example of a method suitable to charge a pilot subsystem of the system of FIG. 1.
Figure 7:
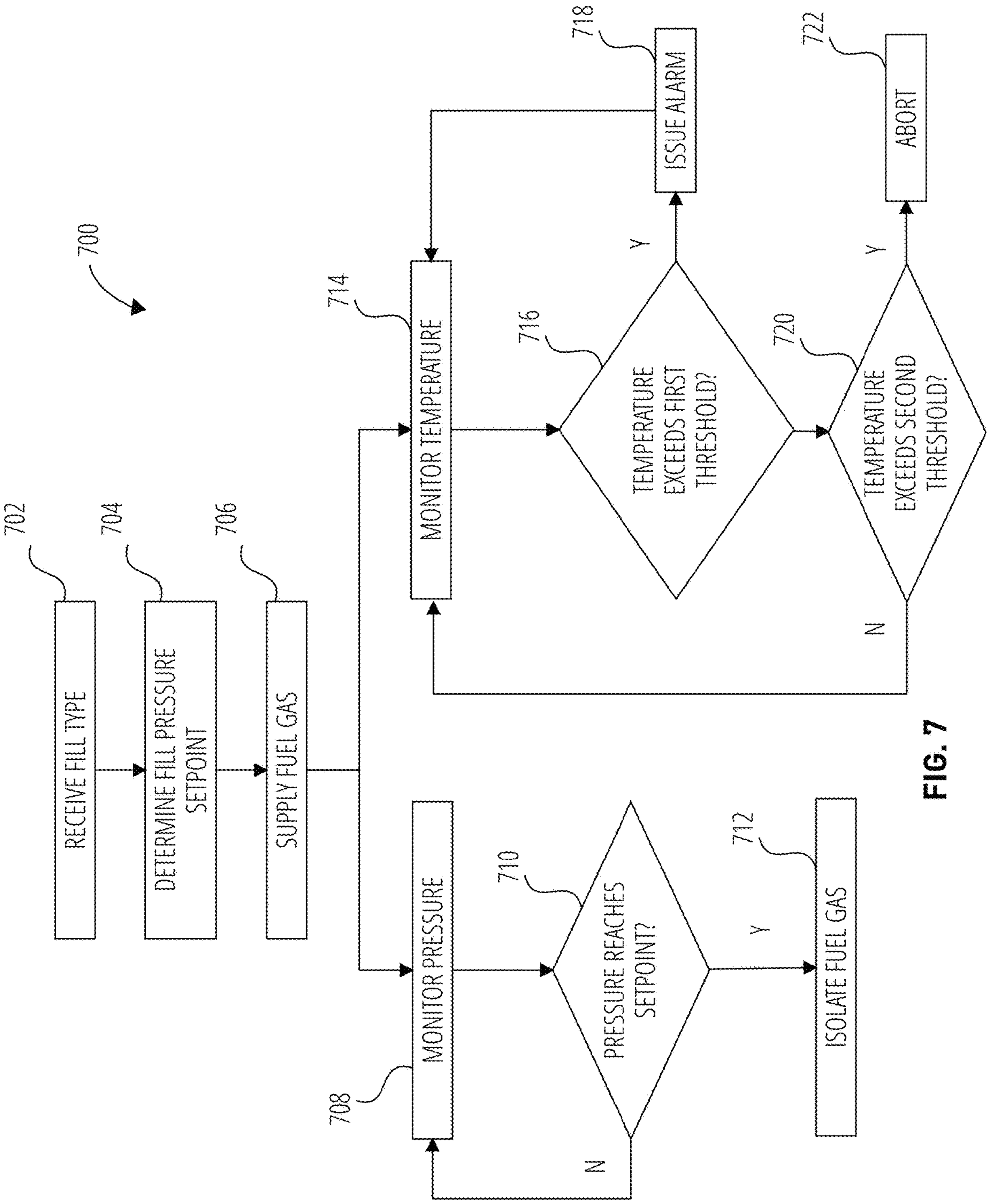
FIG. 7 illustrates an example of a method suitable to fill a fuel gas storage vessel with a fuel gas via the system of FIG. 1.
Figure 8:
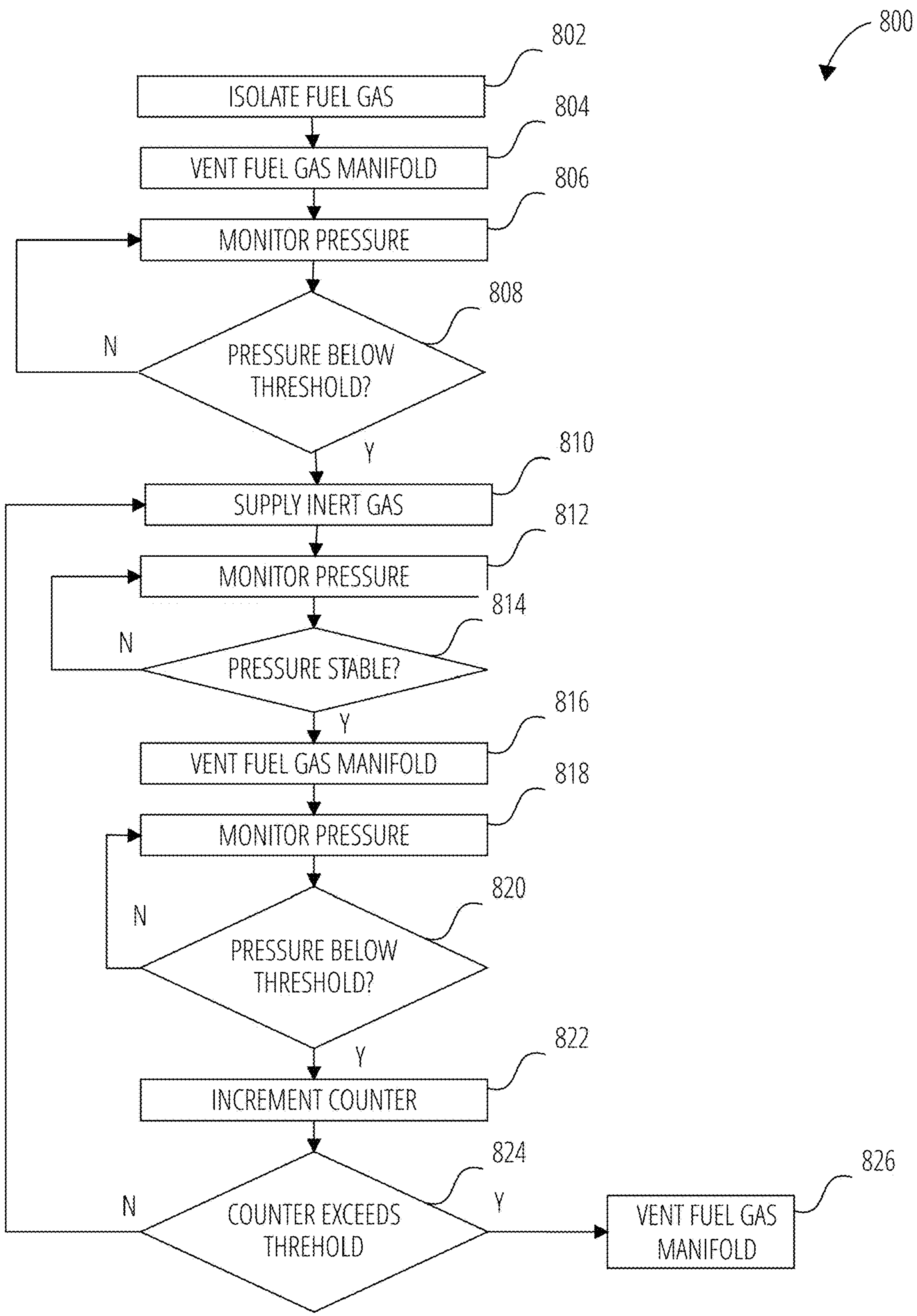
FIG. 8 illustrates an example of a method suitable to purge fuel gas from the system of FIG. 1.

FIG. 3-8 show methods of operating a fueling system such as the fueling system 100. FIG. 3 illustrates an example of a setup method 300 for preparing the fueling system 100 to receive a fuel gas. FIG. 4 illustrates an example of an inerting/purifying method 400 to purge air and/or remnants of fuel gas from the fueling system 100 prior to filling. FIG. 5 illustrates an example of a leak check method 500 to verify the integrity of the fueling system 100. FIG. 6 illustrates an example of a pilot subsystem charge method 600 to charge the pilot subsystem 182. FIG. 7 illustrates an example of a fill method 700 to fill a fuel gas to the one or more fuel gas storage vessels 166 of the fueling system 100. FIG. 8 illustrates an example of a post fill inerting method 800 to purge remnants of a fuel gas from the fuel gas supply manifold 158 of the fueling system 100. The operations of the methods described herein may be executed in an order other than as shown, and in some cases, operations may be executed substantially at the same time. In some implementations, some of the operations may be optional and may be omitted.

As shown in FIG. 3 the setup method 300 may begin in operation 302 and electrical power is supplied to the fueling system 100. The power may be supplied by any suitable power supply, such as a power supply like a fuel cell, generator, battery, engine, or other power source onboard a vehicle. When the fueling system 100 is associated with a boat, shore power may be supplied. Power may be supplied automatically by a processing element such as a PLC, via a relay or other power control device.

The setup method 300 proceeds to operation 304 and the fuel gas supply is connected to the fueling system 100. A fuel gas supply conduit **152*a* may be connected between a fuel gas supply 102 and the fueling system 100**.

The setup method 300 proceeds to operation 306 and the configuration of the valves of the fueling system 100 may be verified. For example, any of the sensors of the fueling system 100 may be selectively isolated fluidically from the fueling system 100. For example, the block valve **138*a* may be located between the fuel gas first stage pressure transmitter 136 and the fuel gas supply manifold 158. The block valve 138*a* may include an actuator such as the block valve actuator 138*b* operative to open and close the block valve 138*a*. The position of the fuel gas storage isolation valve 180*a* may be verified as open, such as by a position indicator associated with the fuel gas storage isolation valve actuator 180*b*. The position of a pilot zone vent valve and/or a defueling valve associated with a fuel gas storage vessel 166** may be verified as closed, such as by a position indicator.

The setup method 300 proceeds to operation 308 and a purge gas is supplied to the purge gas supply manifold 156. For example, a shutoff valve on a purge gas source such as the purge gas supply 144 may be opened. The downstream pressure of the purge gas forward pressure regulator 142 may be adjusted to approximately 5-15 bar. A purge gas may be any suitable gas that can displace air, oxygen, and/or fuel gas from the fueling system 100. In many implementations, the purge gas may be nitrogen, however other suitable non-flammable and/or non-oxidizing gases may be used, such as argon, xenon, krypton, carbon dioxide, or the like.

FIG. 4 illustrates an inerting/purifying method 400 suitable for removing air, purge gas, and/or fuel gas from the fueling system 100. The inerting/purifying method 400 may be suitable for inerting or purifying the fueling system 100 before filling the fueling system 100, such as in the fill method 700. Inerting the fueling system 100 prior to supplying a fuel gas is important from a safety perspective. If a portion of the fueling system 100 includes air that may have infiltrated into the fueling system 100, the addition of a fuel gas without first inerting the fueling system 100 may cause the formation of a flammable mixture of fuel and air. It may also be advantageous to remove air from the fueling system 100 to prevent contamination of the fuel gas. Purifying the system 100 may have the advantage of removing contaminants such as the purge gas such as when purification requirements of the system are stringent (e.g., 99.99% purity). In some examples, the method 400 may be used to inert/purify the fuel gas manifold 158. In some examples, the method 400 may be used to inert/purify the fuel gas storage vessel 166.

The method 400 may proceed to operation 402 and a gas is supplied to the fueling system 100. The method 400 may be used as an inerting method by supplying a purge gas. The method 400 may be used as a purifying method by supplying a fuel gas. When used as an inerting method, the method 400 may begin in operation 402 and the purge gas supply valve **110*a* and the purge gas shutoff valve 148*a* are opened by their respective purge gas supply valve actuator 110*b*, and purge gas shutoff valve actuators 148*b* by the controller 200. The controller 200 may monitor the pressure of the purge gas in the purge gas supply manifold 156 and or the fuel gas supply manifold 158. When used as a purifying method, the operation 402 may proceed with the fuel gas supply shutoff valve 104 opening to supply a fuel gas to the fueling system 100. The controller 200 may monitor the pressure reported by the fuel gas supply pressure transmitter 116. The method may pause from proceeding to other operations until the pressure of the gas stabilizes. Pressure stability may be measured by a time rate of change of the pressure. For example, when the pressure change is less than about 50-100 millibar per minute. The controller 200 may record the value of pressure at which the system stabilizes, such as in the memory component 206** for use later in the method.

The inerting/purifying method 400 proceeds to operation 404 and the controller 200 holds the pressure in the fueling system 100 for a predetermined time. In many implementations, the pressure may be held for about 10 seconds, although pressure may be held for less time (e.g., 1 second, 5 seconds, or the like) or more time (e.g., 15 seconds, 20 seconds, 30 seconds, a minute, or more).

The inerting/purifying method 400 proceeds to operation 406 and the controller 200 monitors the pressure in the fueling system 100 while the pressure is held in the system as in operation 404. If the pressure drops below a threshold, the inerting/purifying method 400 proceeds to operation 408 and issues an alarm and/or takes other suitable action. The operation 408 will be discussed further below. The threshold may be measured as a change relative to the pressure recorded in memory component 206 in operation 402. For example, if the pressure drops more than about 350-millibar from the stable pressure, the inerting/purifying method 400 proceeds to operation 408. Other suitable pressure drops such as about 30-millibar, 70-millibar, 700-millibar, 1.5-bar, 3.4-bar, 7-bar, or higher may be measured and result in an alarm being issued by operation 408. In some implementations, the pressure drop may be measured as a percentage of the pressure measured in operation 402. For example, if the pressure drops by about 1%, 2%, 5%, 10%, or more of the pressure measured in operation 402, an alarm may be issued. In some implementations, the inerting/purifying method 400 proceeds to the operation 408 if the pressure in the fueling system 100 drops below an absolute value, such as below about 1-bar to about 10 bar. For example, the inerting/purifying method 400 may proceed to the operation 1408 if the pressure in the fueling system 100 drops below about 5.5-bar. If the predetermined time in operation 404 lapses and the pressure in the fueling system 100 has not fallen below the threshold, the inerting/purifying method 400 proceeds to the operation 410.

In operation 410, the controller 200 may vent the fuel gas supply manifold 158, fuel gas supply 102, and/or fuel gas storage vessel 166. For example, the controller 200 may open the fuel gas vent valve 126*a* via the fuel gas vent valve actuator 126*b* and/or the valve 189*a*. For example, the valve 189*a* may be used to vent the fuel gas storage vessel 166 via the fuel storage vessel shutoff valve 176*a*. The purge gas and/or fuel gas may escape from the fueling system 100 via the purge gas vent manifold 154*b* to a vent mast indicated by arrow 162.

The operation 410 may be used independent of the method 400 such as to vent the fuel gas supply 102, and/or fuel gas storage vessel 166, such as in an emergency situation. For example, the fuel gas supply 102 may be vented by opening the valve 126*a*. The fuel gas storage vessel 166 may be vented by opening the valve 189*a*. Such venting may be used to vent the fuel gas supply 102 and/or the fuel gas storage vessel 166 at a remote distance away from the respective vessels such as by using a flexible hose connection. The inerting/purifying method 400 may be used to inert the fuel gas supply 102 and/or fuel gas storage vessel 166. Such venting could be advantageous in case either the fuel gas supply 102 and/or fuel gas storage vessel 166 is compromised.

The inerting/purifying method 400 proceeds to the operation 414 and operation 416 and the controller 200 monitors the pressure of the fueling system 100, such as via the fuel gas supply pressure transmitter 116 (e.g., to measure the pressure in the high pressure zone 170) and/or a fuel gas first stage pressure transmitter 136 (e.g., to measure the pressure in the medium pressure zone 168). In operation 416 the controller 200 compares the pressure in the fuel gas supply manifold 158 to a threshold to determine if the fuel gas supply manifold 158 has been vented sufficiently. The controller 200 may monitor either or both of the high pressure zone 170 and/or the medium pressure zone 168. If the pressure is not below the threshold, the inerting/purifying method 400 may return to operation 414 and continue monitoring the pressure in the fuel gas supply manifold 158. The threshold may be close to the ambient pressure such as about 30-millibar, 70-millibar, 700-millibar, 1.5-bar, 3.4-bar, 7-bar. Other suitable lower or higher pressures may be used. When the pressure in the fuel gas supply manifold 158 decays below the threshold, the inerting/purifying method 400 proceeds to operation 418.

In operation 418 the inerting/purifying method 400 may increment a counter. The value of the counter may be stored in the memory component 206. The counter may be an integer value indicative of the number of times the inerting/purifying method 400 has performed operation 402-operation 416.

The inerting/purifying method 400 proceeds to operation 420 and the inerting/purifying method 400 compares the counter to a threshold. If the counter does not exceed the threshold, the inerting/purifying method 400 may return to the operation 402. If the counter meets or exceeds the threshold, the inerting/purifying method 400 proceeds to the operation 412. The counter threshold may be set or determined to assure that the concentration of air or other contaminants in the fueling system 100 has been reduced to a satisfactory level. The cycle threshold may be based on a desired purity of the fuel gas in the fuel gas storage vessel 166. For example, the cycle threshold may be based on the volume and pressure of the fuel gas source 102, the volume of the fuel gas storage vessel 166, and the set pressure of the purge gas regulator 142, and the number of purge cycles that will achieve desired purity (e.g., 99.99% or greater) in the fuel gas storage vessel 166.

In many implementations, the counter threshold may be 3. Other thresholds may be used as desired, for example, the counter threshold may be 1, 2, 4, 5, 6, 7, 8, 9, or even 10. With each cycle, the concentration of contaminants (e.g., air) and/or residual fuel gas (e.g., hydrogen) are reduced relative to the concentration of the purge gas. In operation 412 the controller 200 may isolate the purge gas supply 144 and/or fuel gas supply 102. For example, the controller 200 may close the purge gas shutoff valve 148*a* via the purge gas shutoff valve actuator 148*b* or the fuel gas shutoff valve 104. The purge gas vent valve 108*a* may be opened for a short time (e.g., about 2 seconds) and then closed, via the purge gas vent valve actuator 108*b*. The purge gas vent valve 108*a* may remain open whenever the valve 110*a* is closed, such as in a block and bleed arrangement. Such an arrangement may improve the safety of the fueling system 100 in case the check valve 112 fails and the valve 110*a* fails to stop backflow during fueling with high pressure fuel gas. The fuel gas vent valve 126*a*, purge gas shutoff valve 148*a*, purge gas vent valve 108*a*, and purge gas supply valve 110*a* may all be closed by the controller 200 via their respective actuators.

In operation 408, the controller 200 may close the purge gas shutoff valve 148*a*, and may open the purge gas vent valve 108*a* and the fuel gas vent valve 126*a* to vent the fueling system 100. The controller 200 may issue an alert or alarm to notify a user of a leak in the fueling system 100. The alarm may be a visual alarm, such as an indication on the display 204, a beacon, or the like. The alarm may additionally or alternately be an auditory alarm such as a bell, buzzer, or the like. The alarm may also be an electronic message such as an email, text message or other suitable message transmitted to a user via the network interface 208. The inerting/purifying method 400 proceeds from operation 408 to operation 412.

In some implementations, in the operation 400, the manifold 158 may be connected to a vacuum source and a substantial portion of the gas in the manifold may be removed therefrom. In such implementations, in operation 410, a gas may be introduced to the manifold 158 (e.g., a purge gas or fuel gas). The method 400 may proceed as described otherwise, such as by monitoring appropriate pressure thresholds in operations 406 and 416 and repeating the method one or more times.

In some implementations, the inerting/purifying method 400 may be suitable to activate a solid state storage medium such as a hydride. With some hydrides, an oxide layer forms on the reactive materials of the metal hydride during fabrication. However, the hydride cannot be used until the oxide layer has been removed. Removing the oxide layer can be done by exposing the hydride to a reducing environment, such as by exposing the hydride to hydrogen at a pressure of about 70 bar and a temperature of about 80° C. This process is often referred to referred to as activation. Once activated, the hydride can be used for hydrogen storage, such as in a fuel gas storage vessel 166. For example, in operation 402, the inerting/purifying method 400 may be used with a purge gas as described above to purge air from the hydride. The inerting/purifying method 400 may be adapted and used after inerting to supply the fuel gas (i.e., hydrogen) in operation 403. In operation 404 the pressure and or flow rate of hydrogen may be monitored for the onset of absorption of the hydrogen in the hydride. The pressure and/or flow rate of the hydrogen may be adjusted based on the temperature of the hydride such as to prevent the temperature from exceeding a threshold. The pressure of the hydrogen in the fuel gas storage vessel 166 may be increased until the pressure stabilizes at a level (e.g., about 70-bar). The fuel gas storage vessel 166 may be vented as in operations 410, 414, 416, and 418 as previously described. The fuel gas storage vessel 166 may be exposed to hydrogen charge cycles a number of times (e.g., three, four, or more cycles), until the counter threshold is exceeded in operation 420.

FIG. 5 illustrates an example of a leak check method 500 suitable for checking the fueling system 100 for leaks. In some implementations, the leak check method 500 may be used in place of the inerting/purifying method 400 such that contaminants are purged from the system by the leak check method 500. In some implementations, the leak check method 500 may be omitted. It may be advantageous to leak check the fueling system 100 first using the purge gas, such as described with the operations 404-408 and again using the fuel gas as described in this leak check method 500. The fuel gas may have different leakage or diffusion characteristics than the purge gas, and a leak check with the fuel gas may uncover leaks that a leak check with the purge gas may not. For example, when the purge gas is nitrogen and the fuel gas is hydrogen, hydrogen may leak through fittings, seals, pipe couplings, threads, or the like that nitrogen may not. Hydrogen ($H_2$) is a much smaller molecule than nitrogen (N2) and is capable of escape from containment in ways nitrogen may not. Additionally, the fuel gas may be supplied at pressure much higher than that of the purge gas. For example, a purge gas may be supplied at approximately 5-15 bar, whereas the fuel gas may be supplied at a nominal pressure of up to about 700-bar. Higher pressure gases have a higher tendency to leak from the fueling system 100 than lower pressure gases.

The leak check method 500 may begin in operation 502 and fuel gas is supplied to the fueling system 100. The fuel gas may be supplied at the pressure of the gas supply 102. For example, the fuel gas may be supplied at 1-bar, 10-bar, 100-bar, 200-bar, 300-bar, 350-bar, 400-bar, 500-bar, 700-bar or higher. The controller 200 may open the fuel gas supply shutoff valve 106.

The leak check method 500 proceeds to operation 504 and operation 506. In operation 504, the controller 200 may monitor the pressure of the fuel gas in the fuel gas supply manifold 158. For example, the controller 200 may monitor the pressure reported by the fuel gas supply pressure transmitter 116. The leak check method 500 proceeds to operation 506 and the controller 200 compares the pressure in the fueling system 100 to a threshold. If the pressure is not stable (e.g., exhibits a time rate of change above the threshold), the leak check method 500 may return to the operation 504 and the controller 200 continues to monitor the pressure of the fueling system 100. Pressure stability may be measured by a time rate of change of the pressure, and/or attainment of an absolute pressure value. The controller 200 may record the value of pressure at which the system stabilizes, such as in the memory component 206 for use later in the method. For example, when the pressure change is less than a threshold of about 1-5 bar per minute, the leak check method 500 proceeds to the operation 508.

In operation 508 the controller 200 isolates the fuel gas supply 102. The controller 200 may close the fuel gas supply shutoff valve 106.

The leak check method 500 proceeds to operation 510 and the controller 200 holds the pressure in the fueling system 100 for a predetermined time while monitoring the pressure. In many implementations, the pressure may be held for about 10 seconds, although pressure may be held for less time (e.g., 1 second, 5 seconds, or the like) or more time (e.g., 15 seconds, 20 seconds, 30 seconds, a minute, or more).

The leak check method 500 proceeds to operation 512 and the controller 200 monitors the pressure in the fueling system 100 while the pressure is held in the system as in operation 510. The controller 200 may monitor either or both of the high pressure zone and/or the medium pressure zone 168. If the pressure drops below a threshold, the leak check method 500 proceeds to operation 514 and issues an alarm and/or takes other suitable action. The operation 514 will be discussed further below. The threshold may be measured as a change relative to the pressure recorded in memory component 206 in operation 506. For example, if the pressure drops more than a threshold below the stable pressure, the leak check method 500 proceeds to operation 514. Example thresholds may be similar to those discussed with respect to operation 406 and are not repeated, for the sake of brevity. In some implementations, the leak check method 500 proceeds to the operation 514 if the pressure in the fueling system 100 drops below an absolute value. If the predetermined time in operation 510 lapses and the pressure in the fueling system 100 has not fallen below the threshold, the leak check method 500 proceeds to the pilot subsystem charge method 600 as indicated by arrow 518. Optionally, such as when a pilot subsystem 182 is not used, the method 600 may proceed to the fill method 700.

In some implementations, the operations 510 and 512 may monitor the pressure of the fueling system downstream of a closed valve and determine whether the pressure rises above a threshold. Such a pressure rise may indicate a leak through the valve. For example, the fuel gas may be flowed into the high pressure zone 170, dropped to a lower pressure such as by the fuel gas regulator, first stage 122, and flowed to the medium pressure zone 168. The flow of fuel gas may be arrested by closing the fuel gas shutoff valve 132*a*, such as by the actuator 132*b*. The pressure downstream of the fuel gas shutoff valve 132*a* may be monitored, such as by the fuel gas first stage pressure transmitter 136. A rise in the pressure of the fuel gas detected by the pressure transmitter 136 when the fuel gas shutoff valve 132*a* is in a closed state, may indicate that the fuel gas shutoff valve 132*a* is leaking. An alarm may be issued when such a leak is detected.

Operation 514 may issue an alarm, such as described with respect to the operation 408. Aspects of an alarm issued by operation 514 may be different than those issued by the operation 408. For example, the methods may issue alarms with different error messages, visual indicators, audio indicators, or the like. After issuing an alarm in operation 514, the leak check method 500 proceeds to the post fill inerting method 800 as indicated by arrow 516, and as described below, to inert the fueling system 100 with the purge gas. Inerting the system may be advantageous to enable the safe repair of the system 100 in the absence of a fuel gas.

FIG. 6 illustrates an example of a pilot subsystem charge method 600. As described above, the pilot subsystem 182 may be operative to safely vent the fuel gas storage vessel 166 in the event of a fire. Venting the fuel gas from a fuel gas storage vessel 166 in the event of a fire may have certain safety advantages. For example, if a fire is detected, the fuel gas in the fuel gas storage vessel 166 may be directed away from the fuel gas storage vessel 166 to a vent stack or other remote location away from the fire. This is generally preferable to containing the fuel gas in the fuel gas storage vessel 166 and facing the risk of the fire damaging the fuel gas storage vessel 166 and leading to an explosion should the fuel gas escape if the fuel gas storage vessel 166 were to rupture or leak.

The pilot subsystem charge method 600 may begin in operation 602 and the controller 200 connects the pilot subsystem 182 to the fuel gas supply manifold 158. For example, the controller 200 may open the pilot subsystem shutoff valve 146*a* via the pilot subsystem shutoff valve actuator 146*b*. When the pilot subsystem shutoff valve 146*a* is open, the fuel gas may flow through the valve and may be throttled by the pilot gas throttle 184.

The pilot subsystem charge method 600 proceeds to operation 604 and fuel gas is supplied to the fueling system 100. For example, the controller 200 may open the fuel gas supply shutoff valve 106 allowing fuel gas to flow from the gas supply 102 to the fueling system 100. The fuel gas shutoff valve 132*a*, fuel gas storage isolation valve 180*a*, and pilot subsystem shutoff valve 146*a* may be opened by the controller 200, allowing the fuel gas to flow to the pilot subsystem 182.

The pilot subsystem charge method 600 proceeds to operation 606 and operation 608. In operation 606, the controller 200 may monitor the pressure of the fuel gas in the fuel gas supply manifold 158 and/or the pilot subsystem 182. The controller 200 may monitor either or both of the high pressure zone 170 and/or the medium pressure zone 168. For example, the controller 200 may monitor the pressure in the fuel gas supply manifold 158 reported by the fuel gas supply pressure transmitter 116, the fuel gas first stage pressure transmitter 136, and/or the storage pressure transmitter 174. The controller 200 may monitor the pressure in the pilot subsystem 182 via the fuel gas supply pressure transmitter 118.

The pilot subsystem charge method 600 proceeds to operation 608 and the controller 200 compares the pressure in the fuel gas supply manifold 158 to the pressure in the gas supply 102. In operation 608 the controller 200 compares the pressure in the pilot subsystem 182 to the set point of the fuel gas regulator, first stage 122. The set point of the fuel gas regulator, first stage 122 may be set by the controller 200 such as when the fuel gas regulator, first stage 122 is an automatic pressure control valve (e.g., and I/P). In some implementations, the set point of the fuel gas regulator (first stage) 122 may be a predetermined value stored in the memory component 206. If the pressure is not stable in either the fuel gas supply manifold 158 and/or the pilot subsystem 182 (e.g., exhibits a time rate of change above the threshold), the pilot subsystem charge method 600 may return to the operation 606 and the controller 200 continues to monitor the pressure of the fuel gas supply manifold 158 and the pilot subsystem 182. Pressure stability may be measured by a time rate of change of the pressure, a difference between the gas supply 102 pressure and the fuel gas supply manifold 158 pressure, a difference between the fuel gas regulator (first stage) 122 set point and the pilot subsystem 182 pressure, and/or attainment of an absolute pressure value. The controller 200 may record the value of pressure at which the system stabilizes, such as in the memory component 206 for use later in the method. For example, when the difference in pressure between the gas supply 102 and the fuel gas supply manifold 158 and/or the difference in pressure between the fuel gas regulator (first stage) 122 set point and the pilot subsystem 182 pressure is less than about 1 bar, the pilot subsystem charge method 600 proceeds to operation 610.

In operation 610 the controller 200 isolates the pilot subsystem 182. For example, the controller 200 may close the pilot subsystem shutoff valve 146*a* via the pilot subsystem shutoff valve actuator 146*b*.

FIG. 7 illustrates an example of a fill method 700. The fill method 700 may begin in operation 702 and the controller 200 receives a fill type to be performed. For example, the I/O interface 212 of the controller 200 may prompt a user to select whether the fill should be a final fill pressure type of fill or a temperature-compensated fill. In some examples, a user may be prompted to input information about the fuel gas supply 102 such as volume, pressure, and/or type of fuel gas. In a final fill pressure type of fill, a target fill pressure for the one or more fuel gas storage vessels 166 may be received. In a temperature-compensated fill, the controller 200 may monitor the temperature of the one or more fuel gas storage vessels 166 such as via a fuel gas storage temperature transmitter 178. The system may also monitor the pilot subsystem 182 pressure (e.g., via the transmitter 118) and reduce the set point to the pressure measured by the transmitter 118 if it is lower than the target pressure.

The fill method 700 proceeds to the operation 704 and the controller 200 determines the fill pressure set point. In a final fill pressure type of fill, the fill pressure set point may be received from the I/O interface 212 and/or retrieved from the memory component 206. In a temperature-compensated fill, the fill pressure set point may be determined based on one or more of the initial pressure and/or temperature in the fuel gas storage vessel 166 (such as measured by the storage pressure transmitter 174 and/or fuel gas storage temperature transmitter 178), the pressure in the gas supply 102, and/or a desired fill pressure. In some embodiments, the fill pressure set point may be determined based on an ambient temperature, such as an ambient temperature near the pressure vessel. In one example, the fill pressure set point may be determined based on an equation that relates the fill pressure set point with the initial (before beginning the filling process) pressure in the pressure vessel and an initial ambient temperature. One example of such an equation is shown in equation 1, below.

$$P_2 = a + b*T + c*P_1 + d*T*P_1 \quad (1)$$

Where: $P_2$ is the fill pressure set point $P_1$ is the initial pressure in the pressure vessel T is the initial ambient temperature a, b, c, and d are constants In one example, the constants are: a=3764.337, b=1.666, c=−0.152, d=0.00114.

The fill method 700 proceeds to operation 706 and the fuel gas is supplied to the fuel gas storage vessel 166. For example, the controller 200 may open the fuel gas shutoff valve 132*a*.

The fill method 700 proceeds to operation 714 and operation 708 at substantially the same time, that is operation 714 and operation 708, and the operations that follow them, may be executed in parallel or in serial rapidly one after the other, in any order.

In operation 714, the controller 200 monitors the temperature in the fuel gas storage vessel 166 via the fuel gas storage temperature transmitter 178. The fill method 700 proceeds to operation 716 and compares the temperature to a first threshold. In many implementations the first threshold may be about 75° C. The fill method 700 may proceed to operation 720 and the temperature of the fuel gas storage vessel 166 is compared to a second threshold. In many implementations, the second threshold may be about 85° C. Either of the first or second thresholds may be based on the type of fuel gas storage vessel 166 used. For example, the 75° C. and 85° C. thresholds may be suitable for Type IV tanks with a polymer liner, whereas higher thresholds may be suitable for Type III tanks with a metal liner, or Type I metal tanks with no composite overwrap and generally better heat transfer characteristics than Type III or IV tanks.

If the temperature exceeds the first threshold in operation 716, the fill method 700 may proceed to operation 718 and the controller 200 may issue an alarm as discussed previously with respect to the operation 408 and/or operation 514. The 700 may return to the operation 714 and continue to monitor the temperature.

If the temperature exceeds the second threshold in operation 720 the fill method 700 may proceed to operation 722 and abort the fill method 700. In operation 722, the controller 200 may issue an alarm as discussed previously with respect to the operation 408, operation 514, and/or operation 718. In operation 722 the controller 200 may take additional actions such as closing the fuel gas supply shutoff valve 106, the fuel gas shutoff valve 132*a*, the fuel gas storage isolation valve 180*a*, and/or the fuel storage vessel shutoff valve 176*a*. The controller 200 may not re-enable the execution of the fill method 700 until the temperature returns to a level below either the first or second thresholds.

In operation 708, the controller 200 monitors the pressure in the fuel gas storage vessel 166 via a pressure transmitter such as the storage pressure transmitter 174. The fill method 700 proceeds to operation 710 and the controller 200 compares the pressure in the fuel gas storage vessel 166 to the fill set point determined in operation 704. When the fuel gas storage vessel 166 pressure reaches the set point, optionally within a reasonable deadband of about +/−5%, the fill method 700 proceeds to operation 712 and isolates the fuel gas. When more than one fuel gas storage vessel is used, each vessel may be equipped with a sensor (such as the pressure sensor 174). In such an implementation, separate fuel gas storage vessels may fill unevenly (e.g., due to different initial pressures, different pressure drop in the conduits leading thereto, etc.) and when any of the fuel gas storage vessels reaches the set point, the fill method 700 proceeds to the operation 712 so that no storage vessel exceeds the set point.

In operation 712 the controller 200 closes the fuel gas shutoff valve 132*a*, and may also close the fuel gas storage isolation valve 180*a*, the fuel storage vessel shutoff valve 176*a*, and/or the fuel gas supply shutoff valve 106.

FIG. 8 illustrates an example of a post fill inerting method 800 suitable to purge fuel gas from the fueling system 100, such as after executing the fill method 700. The post fill inerting method 800 may be suitable for inerting the fueling system 100 after filling the fueling system 100, such as in the fill method 700. The post fill inerting method 800 may begin in operation 802. In operation 802 the gas supply 102 is isolated from the fueling system 100. For example, the controller 200 may close the fuel gas shutoff valve 132*a*, the fuel gas storage isolation valve 180*a*, the fuel storage vessel shutoff valve 176*a*, and/or the fuel gas supply shutoff valve 106.

The post fill inerting method 800 may proceed to operation 804 and the controller 200 vents the fuel gas supply manifold 158. In operation 804, the controller 200 may open the fuel gas vent valve 126*a* such as via the fuel gas vent valve actuator 126*b* and/or the purge gas supply valve 110*a* such as via the actuator 110*b*.

The post fill inerting method 800 proceeds to operations 806 and operation 808 which may be substantially similar to operation 414 and operation 416 previously described, further description of which is omitted, for brevity.

The post fill inerting method 800 proceeds to operation 810 and the purge gas is supplied to the fueling system 100. Operation 810 may be substantially similar to operation 402 previously described, further description of which is omitted, for brevity.

The post fill inerting method 800 proceeds to operation 812 and operation 814. In operation 812, the controller 200 may monitor the pressure of the purge gas in the fuel gas supply manifold 158. For example, the controller 200 may monitor the pressure reported by the fuel gas supply pressure transmitter 116. The post fill inerting method 800 proceeds to operation 814 and the controller 200 compares the pressure in the fuel gas supply manifold 158 to a threshold. If the pressure is not stable (e.g., exhibits a time rate of change above the threshold), the post fill inerting method 800 may return to the operation 812 and the controller 200 continues to monitor the pressure of the fuel gas supply manifold 158. Pressure stability may be measured by a time rate of change of the pressure, and/or attainment of an absolute pressure value. The controller 200 may record the value of pressure at which the system stabilizes, such as in the memory component 206 for use later in the post fill inerting method 800. For example, when the pressure change is less than a threshold of about 50-100 millibar per minute, the post fill inerting method 800 proceeds to the operation 816 and the fuel gas supply manifold 158 is vented.

Operation 816 may be substantially similar to operation 804, previously described, further description of which is omitted, for brevity.

The post fill inerting method 800 proceeds to operation 818 and operation 820 which may be substantially similar to operation 414 and operation 416 and/or operations 806 and operation 808 previously described, further description of which is omitted, for brevity. A difference in the gas composition in the fuel gas supply manifold 158 may occur between the execution of operation 806/operation 808 and operation 818/operation 820. In operation 806/operation 808 the fuel gas supply manifold 158 may contain primarily fuel gas, which may be at a high pressure, such as a fill pressure set point determined in the operation 704 of the fill method 700. In operation 818/operation 820 the gas composition in the fuel gas supply manifold 158 may be a low pressure (e.g., 5-15 bar) mixture of residual fuel gas and purge gas.

The post fill inerting method 800 may proceed from operation 820 when the pressure in the fuel gas supply manifold 158 drops below the threshold, and the controller 200 increments a counter in operation 822 and operation 824. Operation 822 and operation 824 may be substantially similar to the operation 418 and operation 420, respectively previously described, further description of which is omitted, for brevity. The post fill inerting method 800 may repeat operation 810 through operation 824 repeatedly to sufficiently purge residual fuel gas from the fuel gas supply manifold 158.

The post fill inerting method 800 proceeds to operation 826 after a sufficient number of purge cycles have been executed to reduce the concentration of fuel gas in the fuel gas supply manifold 158 below limits where it would be flammable if it leaked into the atmosphere (i.e., below a lower flammability limit). In operation 826 the fuel gas supply manifold 158 is vented, as previously described with operation 816. Venting the fuel gas manifold has the benefit of allowing the fuel gas supply conduit 152*a* to be disconnected at a low (preferably close to atmospheric) pressure and with a minimal concentration (preferably below the lower flammability limit) of fuel gas, thus reducing the risk from a fire or explosion.

The description of certain embodiments included herein is merely exemplary in nature and is in no way intended to limit the scope of the disclosure or its applications or uses. In the included detailed description of embodiments of the present systems and methods, reference is made to the accompanying drawings which form a part hereof, and which are shown by way of illustration specific to embodiments in which the described systems and methods may be practiced. These embodiments are described in sufficient detail to enable those skilled in the art to practice presently disclosed systems and methods, and it is to be understood that other embodiments may be utilized, and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The included detailed description is therefore not to be taken in a limiting sense, and the scope of the disclosure is defined only by the appended claims.

From the foregoing it will be appreciated that, although specific embodiments of the invention have been described herein for purposes of illustration, various modifications may be made without deviating from the spirit and scope of the invention.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

As used herein and unless otherwise indicated, the terms “a”, “an”, and “a number of” are taken to mean “one”, “at least one” or “one or more”. Unless otherwise required by context, singular terms used herein shall include pluralities and plural terms shall include the singular.

Unless the context clearly requires otherwise, throughout the description and the claims, the words ‘comprise’, ‘comprising’, and the like are to be construed in an inclusive sense as opposed to an exclusive or exhaustive sense; that is to say, in the sense of “including, but not limited to”. Words using the singular or plural number also include the plural and singular number, respectively. Additionally, the words “herein,” “above,” and “below” and words of similar import, when used in this application, shall refer to this application as a whole and not to any particular portions of the application.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. A portable fuel gas system comprising:

a portable enclosure;

a processor;

a fuel gas supply manifold;

a throttle in fluid communication with the fuel gas supply manifold, wherein the fuel gas supply manifold includes a first pressure zone and a second pressure zone separated from one another by the throttle;

a fuel gas shutoff valve in the first pressure zone, in electrical communication with the processor and operative to control a first flow of a fuel gas through the fuel gas supply manifold and a second flow of the fuel gas from the fuel gas supply manifold to a fuel gas storage vessel;

a vent valve in fluid communication with the fuel gas supply manifold and in electrical communication with the processor; and a pressure transmitter in fluid communication with the fuel gas supply manifold and in electrical communication with the processor, wherein:

the fuel gas supply manifold, the throttle, the vent valve, the pressure transmitter, and the fuel gas shutoff valve are disposed within the portable enclosure, the processor is configured to receive a user input and responsive to the user input, perform a purification sequence on the fuel gas supply manifold comprising:

supplying a first quantity of the first flow of the fuel gas to the fuel gas supply manifold by opening the fuel gas shutoff valve;

monitoring at least one of a first elapsed time since the opening of the fuel gas shutoff valve or, via the pressure transmitter, a pressure in the fuel gas supply manifold;

based on at least one of the first elapsed time or the pressure reaching a first threshold, closing the fuel gas shutoff valve;

monitoring a second elapsed time since the closing of the fuel gas shutoff valve;

based on the second elapsed time reaching a second threshold, venting at least a portion of the first quantity of the first flow of the fuel gas by opening the vent valve;

monitoring at least one of a third elapsed time since the opening of the vent valve or, via the pressure transmitter, the pressure in the fuel gas supply manifold; and based on at least one of the third elapsed time or the pressure reaching a third threshold, closing the vent valve;

wherein the processor is further configured to open the fuel gas shutoff valve to supply the second flow of the fuel gas to the fuel gas storage vessel and to close the fuel gas shutoff valve to stop the supply of the second flow of the fuel gas to the fuel gas storage vessel, the processor configured to close the fuel gas shutoff valve based on a relation between an initial pressure in the fuel gas storage vessel and an initial ambient temperature in the fuel gas storage vessel, the relationship comprising a first constant, a product of a second constant and the initial ambient temperature in the fuel gas storage vessel, a product of a third constant and the initial pressure in the fuel gas storage vessel, and a product of a fourth constant, the initial ambient temperature in the fuel gas storage vessel, and the initial pressure in the fuel gas storage vessel.

2. A portable fuel gas system comprising:

a portable enclosure;

a processor;

a fuel gas supply manifold;

a throttle in fluid communication with the fuel gas supply manifold, wherein the fuel gas supply manifold includes a first pressure zone and a second pressure zone separated from one another by the throttle;

a fuel gas shutoff valve in the first pressure zone, in electrical communication with the processor and operative to control a first flow of a fuel gas through the fuel gas supply manifold and a second flow of the fuel gas from the fuel gas supply manifold to a fuel gas storage vessel;

a vent valve in fluid communication with the fuel gas supply manifold and in electrical communication with the processor; and a pressure transmitter in fluid communication with the fuel gas supply manifold and in electrical communication with the processor, wherein:

the fuel gas supply manifold, the throttle, the vent valve, the pressure transmitter, and the fuel gas shutoff valve are disposed within the portable enclosure, the processor is configured to receive a user input and responsive to the user input the processor is configured to perform a leak check sequence on the fuel gas supply manifold comprising:

supplying a first quantity of the first flow of the fuel gas to the fuel gas supply manifold by opening the fuel gas shutoff valve;

monitoring at least one of an elapsed time since the opening of the fuel gas shutoff valve or, via the pressure transmitter, the pressure in the fuel gas supply manifold;

based on at least one of the elapsed time or the pressure reaching a threshold, closing the fuel gas shutoff valve;

monitoring, via the pressure transmitter, a change in the pressure in the fuel gas supply manifold; and based on the change in the pressure in the fuel gas supply manifold issuing an alarm, or supplying a second quantity of the second flow of the fuel gas to the fuel gas storage vessel;

wherein the processor is further configured to open the fuel gas shutoff valve to supply the second flow of the fuel gas to the fuel gas storage vessel and to close the fuel gas shutoff valve to stop the supply of the second flow of the fuel gas to the fuel gas storage vessel, the processor configured to close the fuel gas shutoff valve based on a relation between an initial pressure in the storage vessel and an initial ambient temperature in the fuel gas storage vessel, the relationship comprising a first constant, a product of a second constant and the initial ambient temperature in the fuel gas storage vessel, a product of a third constant and the initial pressure in the fuel gas storage vessel, and a product of a fourth constant, the initial ambient temperature in the fuel gas storage vessel, and the initial pressure in the fuel gas storage vessel.

3. The portable fuel gas system of claim 1, wherein the fuel gas comprises hydrogen.

4. The portable fuel gas system of claim 1, wherein the vent valve comprises a first fuel gas vent valve in fluid communication with the first pressure zone, and configured to selectively vent the fuel gas from, the first pressure zone.

5. The portable fuel gas system of claim 4, wherein the vent valve comprises a second fuel gas vent valve in fluid communication with the second pressure zone and configured to selectively vent the fuel gas from, the second pressure zone.

6. The portable fuel gas system of claim 1, wherein the throttle comprises an isenthalpic throttle.

7. The portable fuel gas system of claim 2, wherein the second pressure zone is in fluid communication with the fuel gas storage vessel and operative to supply, the second quantity of the second flow of the fuel gas to the fuel gas storage vessel.

8. The portable fuel gas system of claim 2, wherein the second pressure zone is in fluid communication with a pilot system, and operative to supply a portion of the second quantity of the second flow of the fuel gas to the pilot system.

9. The portable fuel gas system of claim 1 further comprising a mobile user device in wireless communication with the processor, wherein the user input comprises a first user input received from the mobile user device via the wireless communication.

10. The portable fuel gas system of claim 1 further comprising a vent mast in fluid communication with the vent valve.

11. The portable fuel gas system of claim 1 further comprising a battery in electrical communication with the processor, the fuel gas shutoff valve, the vent valve, or the pressure transmitter.

12. A computer-implemented method of supplying a fuel gas to a fuel gas storage vessel with a portable fuel gas system, wherein the portable fuel gas system comprises:

a portable enclosure;

a processor;

a fuel gas supply manifold;

a throttle in fluid communication with the fuel gas supply manifold, wherein the fuel gas supply manifold includes a first pressure zone and a second pressure zone separated from one another by the throttle;

a fuel gas shutoff valve in the first pressure zone, in electrical communication with the processor and operative to control a first flow of a fuel gas through the fuel gas supply manifold and a second flow of the fuel gas from the fuel gas supply manifold to a fuel gas storage vessel;

a vent valve in fluid communication with the fuel gas supply manifold and in electrical communication with the processor;

a pressure transmitter in fluid communication with the fuel gas supply manifold and in electrical communication with the processor, wherein the fuel gas supply manifold, the throttle, the vent valve, and the fuel gas shutoff valve are disposed within the portable enclosure; and a non-transitory computer-readable storage medium, the computer-readable storage medium including instructions that when executed by the processor, cause the processor to:

perform a purification sequence on the fuel gas supply manifold comprising:

supplying a first quantity of the first flow of the fuel gas to the fuel gas supply manifold by opening the fuel gas shutoff valve;

monitoring at least one of a first elapsed time since the opening of the fuel gas shutoff valve or, via the pressure transmitter, a pressure in the fuel gas supply manifold;

based on at least one of the first elapsed time or the pressure reaching a first threshold, closing the fuel gas shutoff valve;

monitoring a second elapsed time since the closing of the fuel gas shutoff valve;

based on the second elapsed time reaching a second threshold, venting at least a portion of the first quantity of the first flow of the fuel gas by opening the vent valve; and monitoring at least one of a third elapsed time since the opening of the vent valve or, via the pressure transmitter, the pressure in the fuel gas supply manifold, wherein the processor is further configured to open the fuel gas shutoff valve to supply the second flow of the fuel gas to the fuel gas storage vessel and to close the fuel gas shutoff valve to stop the supply of the second flow of the fuel gas to the fuel gas storage vessel, the processor configured to close the fuel gas shutoff valve based on a relation between an initial pressure in the fuel gas storage vessel and an initial ambient temperature in the fuel gas storage vessel, the relationship comprising a first constant, a product of a second constant and the initial ambient temperature in the fuel gas storage vessel, a product of a third constant and the initial pressure in the fuel gas storage vessel, and a product of a fourth constant, the initial ambient temperature in the fuel gas storage vessel, and the initial pressure in the fuel gas storage vessel.

13. The computer-implemented method of claim 12, wherein the vent valve comprises a first fuel gas vent valve in fluid communication with the first pressure zone and configured to selectively vent the fuel gas from, the first pressure zone.

14. The computer-implemented method of claim 13, wherein the vent valve comprises a second fuel gas vent valve in fluid communication with the second pressure zone and configured to selectively vent the fuel gas from, the second pressure zone.

15. The computer-implemented method of claim 12, wherein the throttle comprises an isenthalpic throttle.

16. The computer-implemented method of claim 12, wherein the second pressure zone is in fluid communication with the fuel gas storage vessel, and operative to supply the first quantity of the first flow of the fuel gas to the fuel gas storage vessel.

17. The computer-implemented method of claim 12, wherein the second pressure zone is in fluid communication with a pilot system and operative to supply a portion of the first quantity of the first flow of the fuel gas to the pilot system.

* * * * *